United States Patent
Song et al.

(10) Patent No.: US 11,206,363 B2
(45) Date of Patent: Dec. 21, 2021

(54) ELECTRONIC DEVICE AND METHOD FOR CORRECTING IMAGE IN CAMERA SWITCHING

(71) Applicant: Samsung Electronics Co., Ltd., Suwon-si (KR)

(72) Inventors: Wonseok Song, Suwon-si (KR); Bohee Lee, Suwon-si (KR); Sehyun Lee, Suwon-si (KR); Junghwan Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/105,914

(22) Filed: Nov. 27, 2020

(65) Prior Publication Data

US 2021/0168304 A1 Jun. 3, 2021

(30) Foreign Application Priority Data

Dec. 2, 2019 (KR) .................. 10-2019-0158430

(51) Int. Cl.
*H04N 5/262* (2006.01)
*H04N 5/247* (2006.01)
(Continued)

(52) U.S. Cl.
CPC ......... *H04N 5/2628* (2013.01); *H04N 5/2257* (2013.01); *H04N 5/2329* (2013.01);
(Continued)

(58) Field of Classification Search
CPC ............. H04N 5/2628; H04N 5/23258; H04N 5/23267; H04N 5/247; H04N 5/268; H04N 5/2257; H04N 5/2329
See application file for complete search history.

(56) References Cited

U.S. PATENT DOCUMENTS 9,325,889 B2 4/2016 Desai et al.
2010/0208107 A1* 8/2010 Nonaka ................. G06F 1/1626
348/240.99
(Continued)

FOREIGN PATENT DOCUMENTS

| KR | 10-2015-0108561 A | 9/2015 |
| KR | 10-2016-0057939 A | 5/2016 |
| WO | 2016/104830 A1 | 6/2016 |

OTHER PUBLICATIONS

International Search Report dated Mar. 2, 2021, issued in International Application No. PCT/KR2020/017096.

*Primary Examiner* — Mekonnen D Dagnew
(74) *Attorney, Agent, or Firm* — Jefferson IP Law, LLP

(57) ABSTRACT

An electronic device is provided. The electronic device includes a housing, a camera module, a memory, a gyro sensor, and a processor. The housing may include a front plate, a rear plate, and a lateral member surrounding a space between the front plate and the rear plate. The camera module may include a first camera disposed in the space and performing shooting based on a first direction, a second camera disposed in the space and performing shooting based on a second direction, and an image signal processor for correcting images. The processor may be configured to control at least one of the first camera or the second camera to capture images, to identify a camera switching command while capturing the images, to acquire gyro motion information through the gyro sensor in response to the camera switching command, and to control the image signal processor to correct the captured images.

20 Claims, 14 Drawing Sheets

(51) Int. Cl.
 *H04N 5/225* (2006.01)
 *H04N 5/268* (2006.01)
 *H04N 5/232* (2006.01)

(52) U.S. Cl.
 CPC ..... *H04N 5/23258* (2013.01); *H04N 5/23267* (2013.01); *H04N 5/247* (2013.01); *H04N 5/268* (2013.01)

(56) References Cited

U.S. PATENT DOCUMENTS

| | | |
|---|---|---|
| 2010/0259649 A1 | 10/2010 | Aisaka et al. |
| 2012/0274808 A1* | 11/2012 | Chong ............. H04N 5/232933 348/234 |
| 2014/0177008 A1* | 6/2014 | Raymond ............ B42D 25/342 358/3.28 |
| 2014/0211032 A1 | 7/2014 | Owen et al. |
| 2014/0232905 A1 | 8/2014 | Jung et al. |
| 2016/0182828 A1* | 6/2016 | Ikeda ................ H04N 5/23264 348/208.5 |

* cited by examiner

ELECTRONIC DEVICE AND METHOD FOR CORRECTING IMAGE IN CAMERA SWITCHING

CROSS-REFERENCE TO RELATED APPLICATION(S)

This application is based on and claims priority under 35 U.S.C. § 119(a) of a Korean patent application number 10-2019-0158430, filed on Dec. 2, 2019, in the Korean Intellectual Property Office, the disclosure of which is incorporated by reference herein in its entirety.

BACKGROUND

1. Field

The disclosure relates to an electronic device and method for correcting an image in camera switching.

2. Description of Related Art

With the growth of digital technologies, a great variety of electronic devices, such as a mobile communication terminal, a personal digital assistant (PDA), a smart phone, and a tablet personal computer (PC), capable of processing wireless communication and various tasks have been popularized.

Normally the electronic device may include at least one camera mounted therein to capture an image, for example, a front camera disposed on the front surface thereof and a rear camera disposed on the rear surface thereof. In some cases, the electronic device may include a plurality of cameras on the front and/or rear surface(s).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device to capture an image through the front camera or the rear camera and display the captured image through a display thereof. In addition, the electronic device may perform a horizontal flip (e.g., left/right switching) and/or vertical flip (e.g., top/bottom switching) of the captured image and store a resultant image in a memory thereof. Also, the electronic device may perform an image stabilization such as a video digital image stabilization (VDIS) of the captured image.

Another aspect of the disclosure is to provide techniques to correct images (e.g., moving images) when an electronic device including front and rear cameras captures the images.

Another aspect of the disclosure is to provide an electronic device and method for correcting images (e.g., moving images) in switching from a front camera to a rear camera and vice versa.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate, a rear plate opposed to and spaced apart from the front plate, and a lateral member surrounding a space between the front plate and the rear plate, a camera module including a first camera disposed in the space and performing shooting based on a first direction corresponding to the front plate, a second camera disposed in the space and performing shooting based on a second direction corresponding to the rear plate, and an image signal processor for correcting images captured using at least one of the first camera or the second camera, a memory, a gyro sensor, and a processor operatively connected to the camera module, the memory, and the gyro sensor. The processor may be configured to control at least one of the first camera or the second camera to capture images, to identify a camera switching command while capturing the images, to acquire gyro motion information through the gyro sensor in response to the camera switching command, and to control the image signal processor to correct the captured images, based on the acquired gyro motion information.

In accordance with another aspect of the disclosure, an electronic device is provided. The electronic device includes a housing including a front plate, a rear plate opposed to and spaced apart from the front plate, and a lateral member surrounding a space between the front plate and the rear plate, a first camera disposed in the space and performing shooting based on a first direction corresponding to the front plate, a second camera disposed in the space and performing shooting based on a second direction corresponding to the rear plate, a memory, a gyro sensor, and an application processor operatively connected to the first camera, the second camera, the memory, and the gyro sensor, and correcting images captured using at least one of the first camera or the second camera. The application processor may be configured to control at least one of the first camera or the second camera to capture images, to identify a camera switching command while capturing the images, to acquire gyro motion information through the gyro sensor in response to the camera switching command, to calculate a rolling shutter (RS) correction value corresponding to the acquired gyro motion information, and to correct the captured images, based on the acquired gyro motion information and the calculated RS correction value.

In accordance with another aspect of the disclosure, an image correction method of an electronic device is provided. The image correction method includes capturing images by using at least one of a first camera or a second camera, wherein the first camera performs shooting based on a first direction corresponding to a front plate of the electronic device, and the second camera performs shooting based on a second direction corresponding to a rear plate of the electronic device, identifying a camera switching command while capturing the images, acquiring gyro motion information through a gyro sensor of the electronic device in response to the camera switching command, and correcting the captured images, based on the acquired gyro motion information, by an image signal processor of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
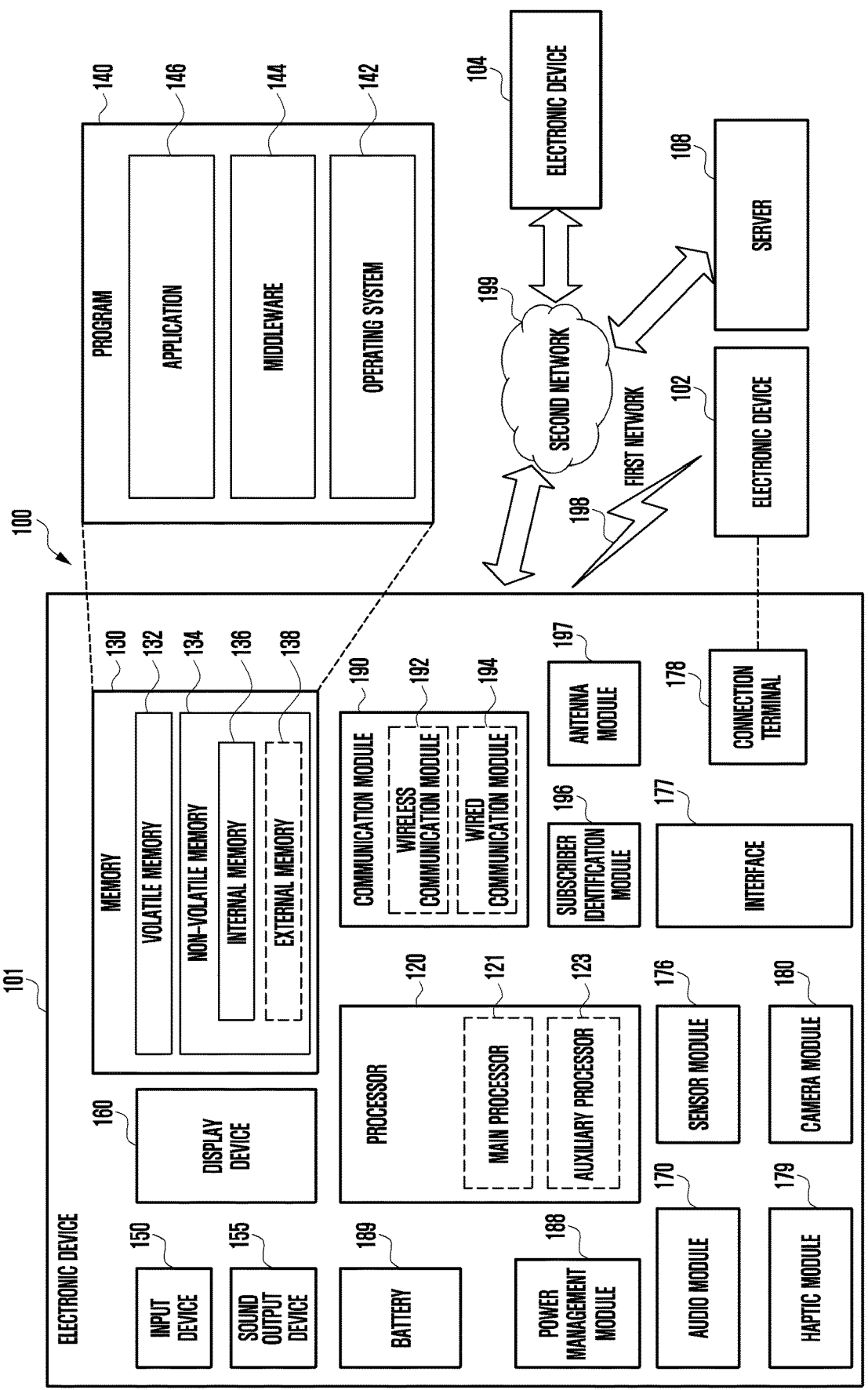
FIG. 1 is a block diagram illustrating an electronic device in a network environment according to an embodiment of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identity module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
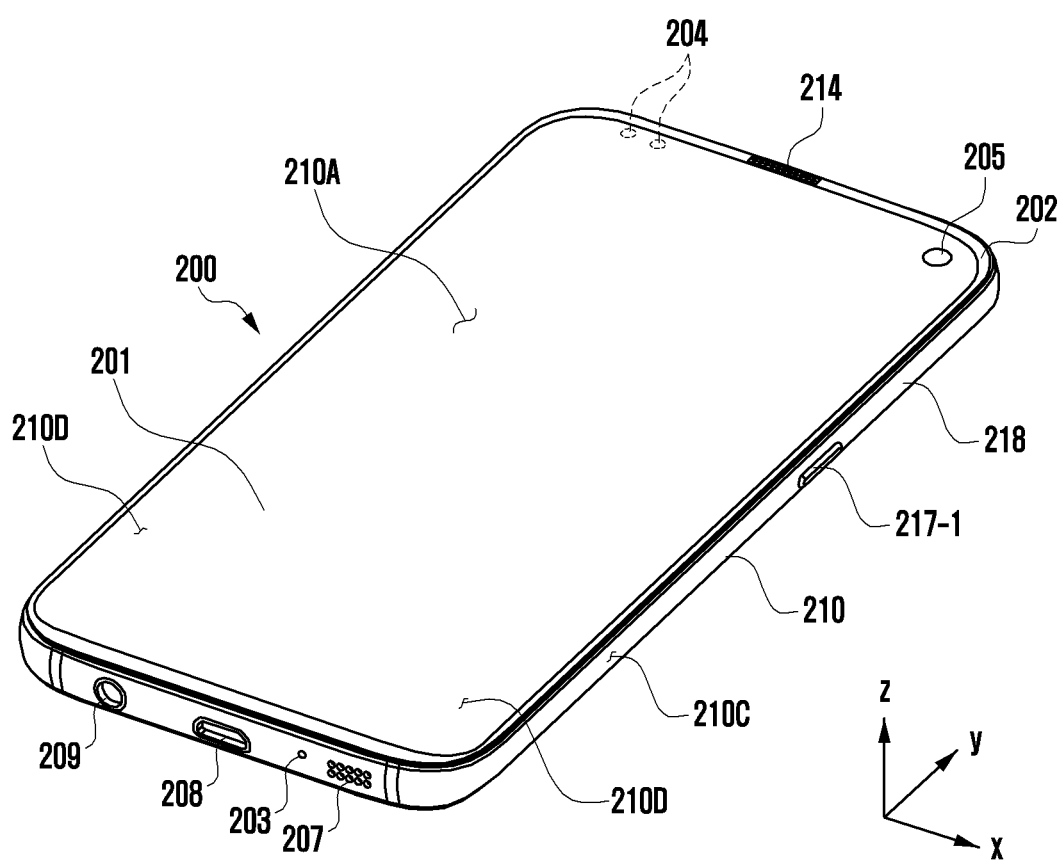
FIG. 2 is a perspective view illustrating a mobile electronic device according to an embodiment of the disclosure.

FIG. 2 illustrates a perspective view showing a front surface of a mobile electronic device according to an embodiment of the disclosure.

Figure 3:
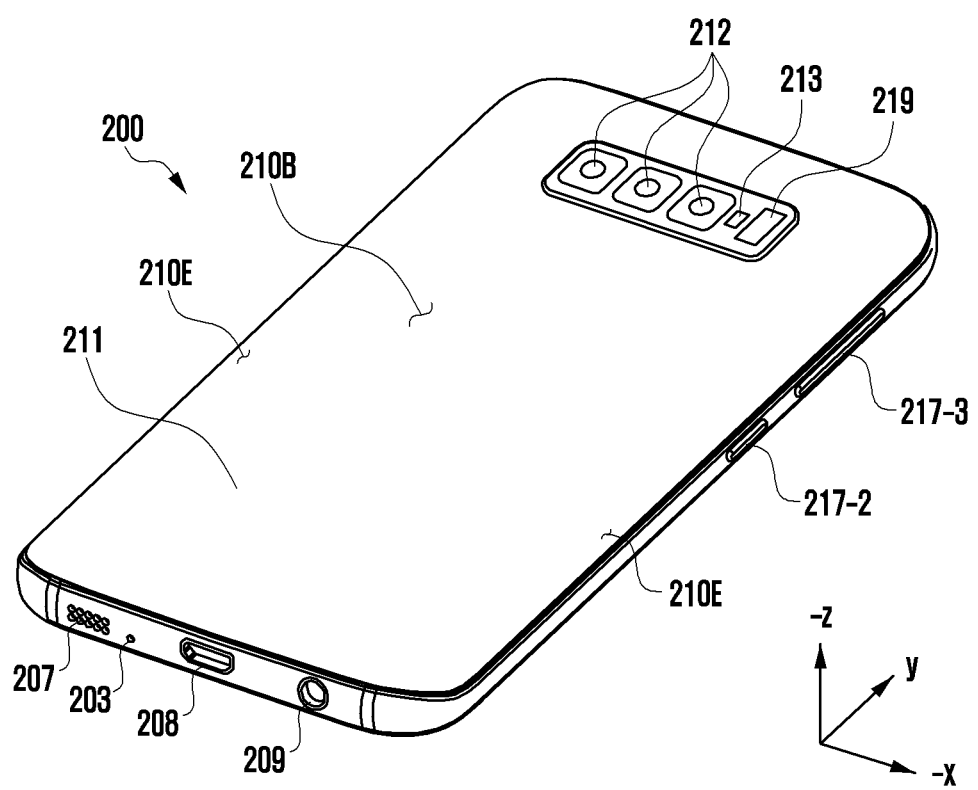
FIG. 3 is a perspective view illustrating a rear surface of a mobile electronic device according to an embodiment of the disclosure.

FIG. 3 illustrates a perspective view showing a rear surface of the mobile electronic device shown in FIG. 2 according to an embodiment of the disclosure.

The electronic device 200 of FIGS. 2 and 3 may be similar at least in part to the electronic device 101 of FIG. 1, or may include other embodiments of the electronic device.

Referring to FIGS. 2 and 3, the mobile electronic device 200 may include a housing 210 that includes a first surface (or front surface) 210A, a second surface (or rear surface) 210B, and a lateral surface 210C that surrounds a space between the first surface 210A and the second surface 210B. The housing 210 may refer to a structure that forms a part of the first surface 210A, the second surface 210B, and the lateral surface 210C. The first surface 210A may be formed of a front plate 202 (e.g., a glass plate or polymer plate coated with a variety of coating layers) at least a part of which is substantially transparent. The second surface 210B may be formed of a rear plate 211 which is substantially opaque. The rear plate 211 may be formed of, for example, coated or colored glass, ceramic, polymer, metal (e.g., aluminum, stainless steel (STS), or magnesium), or any combination thereof. The lateral surface 210C may be formed of a lateral bezel structure (or "lateral member") 218 which is combined with the front plate 202 and the rear plate 211 and includes a metal and/or polymer. The rear plate 211 and the lateral bezel structure 218 may be integrally formed and may be of the same material (e.g., a metallic material such as aluminum).

The front plate 202 may include two first regions 210D disposed at long edges thereof, respectively, and bent and extended seamlessly from the first surface 210A toward the rear plate 211. Similarly, the rear plate 211 may include two second regions 210E disposed at long edges thereof, respectively, and bent and extended seamlessly from the second surface 210B toward the front plate 202. The front plate 202 (or the rear plate 211) may include only one of the first regions 210D (or of the second regions 210E). The first regions 210D or the second regions 210E may be omitted in part. When viewed from a lateral side of the mobile electronic device 200, the lateral bezel structure 218 may have a first thickness (or width) on a lateral side where the first region 210D or the second region 210E is not included, and may have a second thickness, being less than the first thickness, on another lateral side where the first region 210D or the second region 210E is included.

The mobile electronic device 200 may include at least one of a display 201, audio modules 203, 207 and 214, sensor modules 204 and 219, camera modules 205, 212 and 213, a key input device 217-1, 217-2, 217-3, a light emitting device, and connector holes 208 and 209. The mobile electronic device 200 may omit at least one (e.g., the key input device 217-1, 217-2, 217-3 or the light emitting device) of the above components, or may further include other components.

The display 201 may be exposed through a substantial portion of the front plate 202, for example. At least a part of the display 201 may be exposed through the front plate 202 that forms the first surface 210A and the first region 210D of the lateral surface 210C. The display 201 may be combined with, or adjacent to, a touch sensing circuit, a pressure sensor capable of measuring the touch strength (pressure), and/or a digitizer for detecting a stylus pen. At least a part of the sensor modules 204 and 219 and/or at least a part of the key input device 217-1, 217-2, 217-3 may be disposed in the first region 210D and/or the second region 210E.

The audio modules 203, 207 and 214 may correspond to a microphone hole 203 and speaker holes 207 and 214, respectively. The microphone hole 203 may contain a microphone disposed therein for acquiring external sounds and, in a case, contain a plurality of microphones to sense a sound direction. The speaker holes 207 and 214 may be classified into an external speaker hole 207 and a call receiver hole 214. In some embodiments, microphones 203, speakers, and connector holes 208 and 209 may be disposed in the space of the electronic device 200 and exposed to the outside through at least one hole formed in the housing 210. In some embodiments, the microphone hole 203 and the speaker holes 207 and 214 may be implemented as a single hole. In some embodiments, a speaker (e.g., a piezo speaker) may be provided without the speaker holes 207 and 214.

The sensor modules 204 and 219 may generate electrical signals or data corresponding to an internal operating state of the mobile electronic device 200 or to an external environmental condition. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 (e.g., a heart rate monitor (HRM) sensor) and/or a fourth sensor module (e.g., a fingerprint sensor) disposed on the second surface 210B of the housing 210. The fingerprint sensor may be disposed on the second surface 210B as well as the first surface 210A (e.g., the display 201) of the housing 210. The electronic device 200 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor. According to an embodiment, the electronic device 200 may identify gyro data for the electronic device 200 through the gyro sensor and, based on the identified gyro data, correct images displayed on the display 201. According to an embodiment, the electronic device 200 may correct, based on the gyro data, moving images (or video) captured through the camera modules 205, 212, and 213.

The camera modules 205, 212 and 213 may include a first camera module 205 disposed on the first surface 210A of the electronic device 200, and a second camera module 212 and/or a flash 213 disposed on the second surface 210B. The camera module 205 or the camera module 212 may include one or more lenses, an image sensor, and/or an image signal processor. The flash 213 may include, for example, a light emitting diode or a xenon lamp. Two or more lenses (infrared cameras, wide angle and telephoto lenses) and image sensors may be disposed on one side of the electronic device 200.

The key input devices 217-1, 217-2, and 217-3 may be disposed on the lateral surface 210C of the housing 210. The mobile electronic device 200 may not include some or all of the key input devices 217-1, 217-2, and 217-3 described above, and the key input device 217-1, 217-2, or 217-3 which is not included may be implemented in another form such as a soft key on the display 201. The key input devices 217-1, 217-2, and 217-3 may include the sensor module disposed on the second surface 210B of the housing 210. In another embodiment, the key input devices 217-1, 217-2, and 217-3 may be implemented using a pressure sensor included in the display 201.

The light emitting device may be disposed on the first surface 210A of the housing 210. For example, the light emitting device may provide status information of the electronic device 200 in an optical form. The light emitting device may provide a light source associated with the operation of the camera module 205. The light emitting device may include, for example, a light emitting diode (LED), an IR LED, or a xenon lamp.

The connector holes 208 and 209 may include a first connector hole 208 adapted for a connector (e.g., a USB connector) for transmitting and receiving power and/or data to and from an external electronic device, and/or a second connector hole 209 adapted for a connector (e.g., an earphone jack) for transmitting and receiving an audio signal to and from an external electronic device.

Some sensor modules of camera modules 205 and 212, some sensor modules 204 of sensor modules 204 and 219, or an indicator may be arranged to be exposed through a display 201. For example, the camera module 205, the sensor module 204, or the indicator may be arranged in the internal space of an electronic device 200 so as to be brought into contact with an external environment through an opening of the display 201, which is perforated up to a front plate 202. In another embodiment, some sensor modules 204 may be arranged to perform their functions without being visually exposed through the front plate 202 in the internal space of the electronic device. For example, in this case, an area of the display 201 facing the sensor module may not require a perforated opening.

Figure 4:
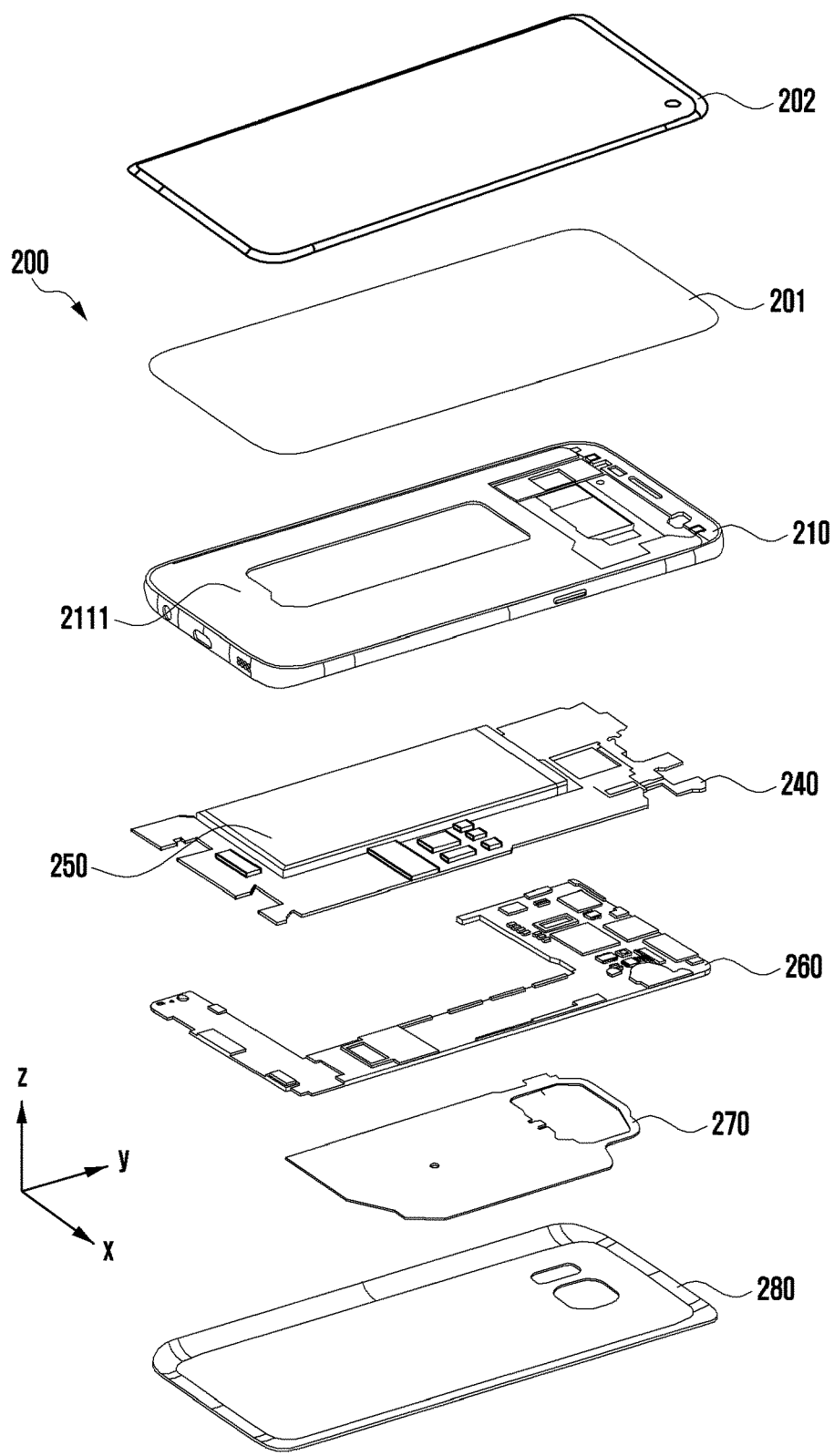
FIG. 4 is an exploded perspective view of a mobile electronic device according to an embodiment of the disclosure.

FIG. 4 illustrates an exploded perspective view showing a mobile electronic device shown in FIG. 2 according to an embodiment of the disclosure.

Referring to FIG. 4, the mobile electronic device 200 may include a lateral bezel structure 210, a first support member 2111 (e.g., a bracket), a front plate 202, a display 201, an electromagnetic induction panel, a PCB 240, a battery 250, a second support member 260 (e.g., a rear case), an antenna 270, and a rear plate 280. The mobile electronic device 200 may omit at least one (e.g., the first support member 2111 or the second support member 260) of the above components or may further include another component. Some components of the electronic device 200 may be the same as or similar to those of the mobile electronic device 200 shown in FIG. 2 or FIG. 3, thus, descriptions thereof are omitted below.

The first support member 2111 is disposed inside the mobile electronic device 200 and may be connected to, or integrated with, the lateral bezel structure 210. The first support member 2111 may be formed of, for example, a metallic material and/or a non-metal (e.g., polymer) material. The first support member 2111 may be combined with the display 201 at one side thereof and also combined with the PCB 240 at the other side thereof. On the PCB 240, a processor, a memory, and/or an interface may be mounted. The processor may include, for example, one or more of a CPU, an AP, a GPU, an ISP, a sensor hub processor, or a CP.

The memory 130 may include, for example, volatile memory 132 or non-volatile memory 134.

The interface may include, for example, a high definition multimedia interface (HDMI), a USB interface, a secure digital (SD) card interface, and/or an audio interface. The interface may electrically or physically connect the mobile electronic device 200 with an external electronic device and may include a USB connector, an SD card/multimedia card (MMC) connector, or an audio connector.

The battery 250 is a device for supplying power to at least one component of the mobile electronic device 200, and may include, for example, a non-rechargeable primary battery, a rechargeable secondary battery, or a fuel cell. At least a part of the battery 250 may be disposed on substantially the same plane as the PCB 240. The battery 250 may be integrally disposed within the mobile electronic device 200, and may be detachably disposed from the mobile electronic device 200.

The antenna 270 may be disposed between the rear plate 280 and the battery 250. The antenna 270 may include, for example, a near field communication (NFC) antenna, a wireless charging antenna, and/or a magnetic secure transmission (MST) antenna. The antenna 270 may perform short-range communication with an external device, or transmit and receive power required for charging wirelessly. An antenna structure may be formed by a part or combination of the lateral bezel structure 210 and/or the first support member 2111.

Figure 5A:
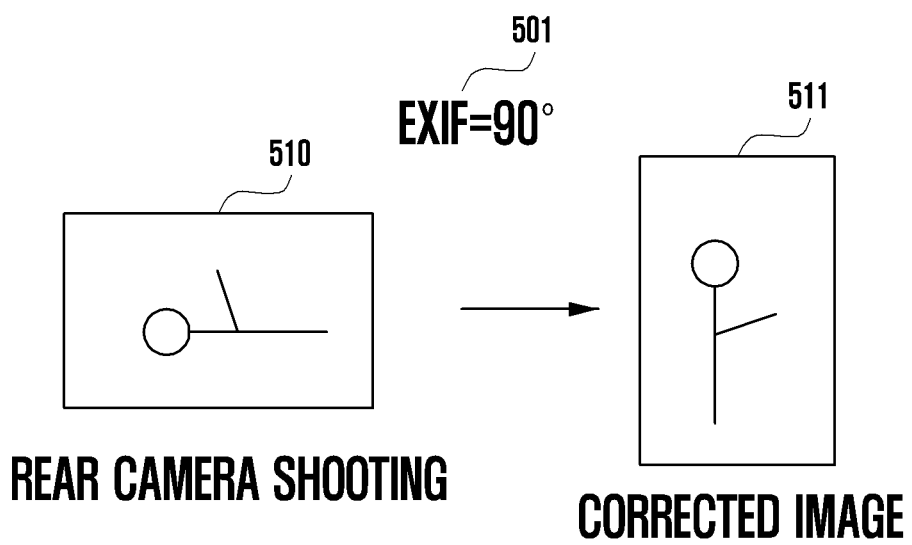
FIGS. 5A and 5B are diagrams illustrating a method of correcting an image when capturing the image through a front camera or a rear camera according to various embodiments of the disclosure.
Figure 5B:
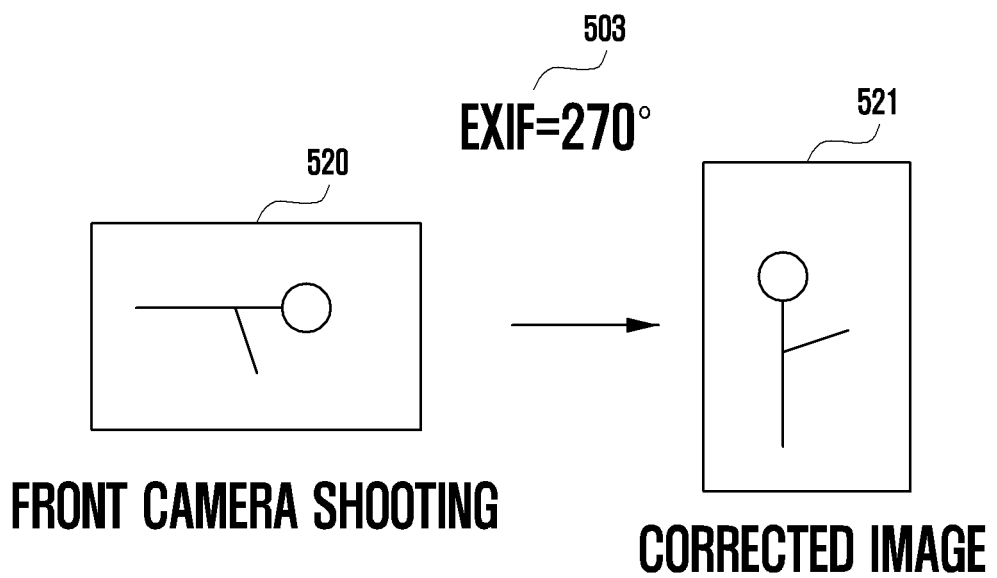

FIGS. 5A and 5B are diagrams illustrating a method of correcting an image when capturing the image through a front camera or a rear camera according to various embodiments of the disclosure.

Referring to FIG. 5A, it illustrates a method of correcting an image captured using a rear camera (e.g., the rear camera module 212 in FIG. 2) of an electronic device (e.g., the electronic device 200 in FIG. 2). According to an embodiment, when the electronic device 200 captures a first image 510 by using the rear camera module 212, the electronic device 200 may identify an exchangeable image file format (EXIF) value 501 corresponding to the rear camera module 212 at a shooting time. For example, the EXIF value 501 is a value for correcting the direction of the captured image and may be set corresponding to at least one camera. According to an embodiment, the EXIF value 501 may be set by a developer and stored in a memory (e.g., the memory 130 in FIG. 1) in the form of a file. According to another embodiment, using a gyro sensor or an acceleration sensor included in a sensor module (e.g., the sensor module 176 in FIG. 1), the electronic device 200 may identify angle information (e.g., posture information and/or direction information) about the electronic device 200. The electronic device 200 may store the identified angle information in the memory 130. According to another embodiment, the electronic device 200 may store the angle information in at least one field of an EXIF format. The angle information may be a value measured using the gyro sensor or the acceleration sensor. The electronic device 200 may calculate the EXIF value, based on the angle information stored in the EXIF format. For example, the electronic device 200 may determine a correction direction of the first image 510, based on the EXIF value 501 (e.g., about 90 degrees) of the rear camera module 212. Then the electronic device 200 may correct the first image 510 in accordance with the correction direction, store the corrected image 511 in the memory 130, and display the corrected image 511 through a display (e.g., the display 201 in FIG. 2). According to another embodiment, the electronic device 200 may perform correction on the first image 510 in real time and output the corrected image 511 through the display 201. According to an embodiment, the electronic device 200 may encode the first image 510, based on the EXIF value 501 of the rear camera module 212. The electronic device 200 may generate the corrected image 511 through the encoding and store it in the memory 130. The electronic device 200 may display the corrected image 511 through the display 201.

Referring to FIG. 5B, it illustrates a method of correcting an image captured using a front camera (e.g., the front camera module 205 in FIG. 2) of the electronic device 200. According to an embodiment, when the electronic device 200 captures a second image 520 by using the front camera module 205, the electronic device 200 may identify an EXIF value 503 corresponding to the front camera module 205 at a shooting time. The electronic device 200 may determine a correction direction of the second image 520, based on the EXIF value 503 (e.g., about 270 degrees) of the front camera module 205. Then the electronic device 200 may correct the second image 520 in accordance with the correction direction, store the corrected image 521 in the memory 130, and display the corrected image 521 through the display 201. According to another embodiment, the electronic device 200 may perform correction on the second image 520 in real time and output the corrected image 521 through the display 201. According to an embodiment, the electronic device 200 may encode the second image 520, based on the EXIF value 503 of the front camera module 205. The electronic device 200 may generate the corrected image 521 through the encoding and store it in the memory 130. The electronic device 200 may display the corrected image 521 through the display 201.

Figure 5C:
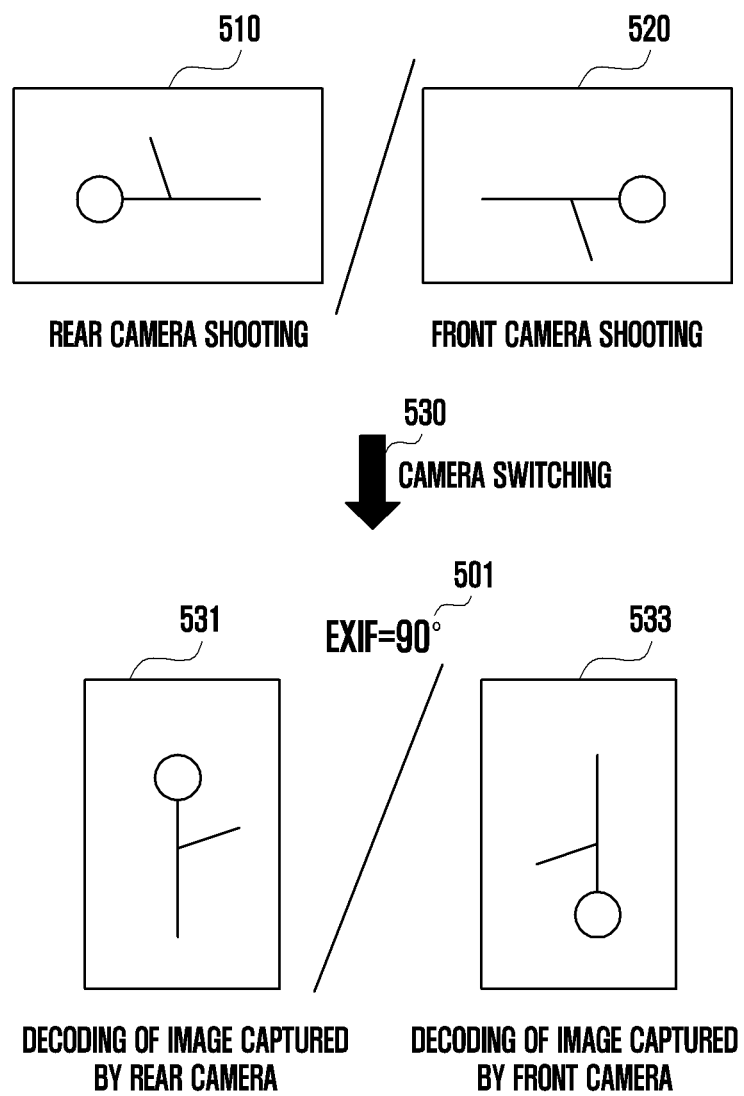
FIG. 5C is a diagram illustrating an image correction method in switching from a rear camera to a front camera according to an embodiment of the disclosure.

FIG. 5C is a diagram illustrating an image correction method in switching from a rear camera to a front camera according to an embodiment of the disclosure.

Referring to FIG. 5C, when the electronic device 200 shoots using the rear camera module 212, the first image 510 may be substantially generated. Then, the electronic device 200 may correct the first image 510, based on an EXIF value corresponding to the rear camera module 212. When the electronic device 200 shoots using the front camera module 205, the second image 520 may be substantially generated. Then, the electronic device 200 may correct the second image 520, based on an EXIF value corresponding to the front camera module 205.

According to various embodiments, when camera switching is performed, the electronic device 200 may correct an image captured by a certain camera, based on a set EXIF value. For example, the set EXIF value may be determined corresponding to the camera being capturing the image at a shooting time. According to an embodiment, when the camera switching is done from the rear camera module 212 to the front camera module 205, the electronic device 200 may identify the EXIF value 501 (e.g., about 90 degrees) corresponding to the rear camera module 212 and, based on the identified EXIF value 501, correct the captured image.

Referring to FIG. 5C, the electronic device 200 may decode the first image 510 captured by the rear camera module 212, based on the EXIF value 501, and thereby generate a third image 531. Then the electronic device 200 may store the third image 531 in the memory 130.

Referring to FIG. 5C, the electronic device 200 may decode the second image 520 captured by the front camera module 205, based on the EXIF value 501, and thereby generate a fourth image 533. Then the electronic device 200 may store the fourth image 533 in the memory 130.

According to various embodiments, the electronic device 200 may capture the first image 510 by using the rear camera module 212 and, based on the EXIF value 501, decode the captured first image 510. According to an embodiment, while capturing the first image 510 by using the rear camera module 212, the electronic device 200 may identify a camera switching command 530 and switch from the rear camera module 212 to the front camera module 205. Then, the electronic device 200 may capture the second image 520 by using the front camera module 205 and, based on the EXIF value 501, decode the captured second image 520 into the fourth image 533. The electronic device 200 may store the fourth image 533 in the memory 130.

According to various embodiments, when switching from the rear camera module 212 to the front camera module 205, the second image 520 captured using the front camera module 205 needs to be corrected to meet the user's intention. The second image 520 may be corrected based on at least one of an EXIF value or angle information (e.g., posture information and/or direction information) of the electronic device 200. According to an embodiment, the electronic device 200 may identify a command of switching from the rear camera module 212 to the front camera module 205 and, in response to the command, identify the angle information (e.g., posture information and/or direction information) of the electronic device 200 through at least one sensor (e.g., the sensor module 176 in FIG. 1). Then, based on the identified angle information, the electronic device 200 may decode an image captured through the front camera module 205 and store the decoded image in the memory 130.

Figure 6:
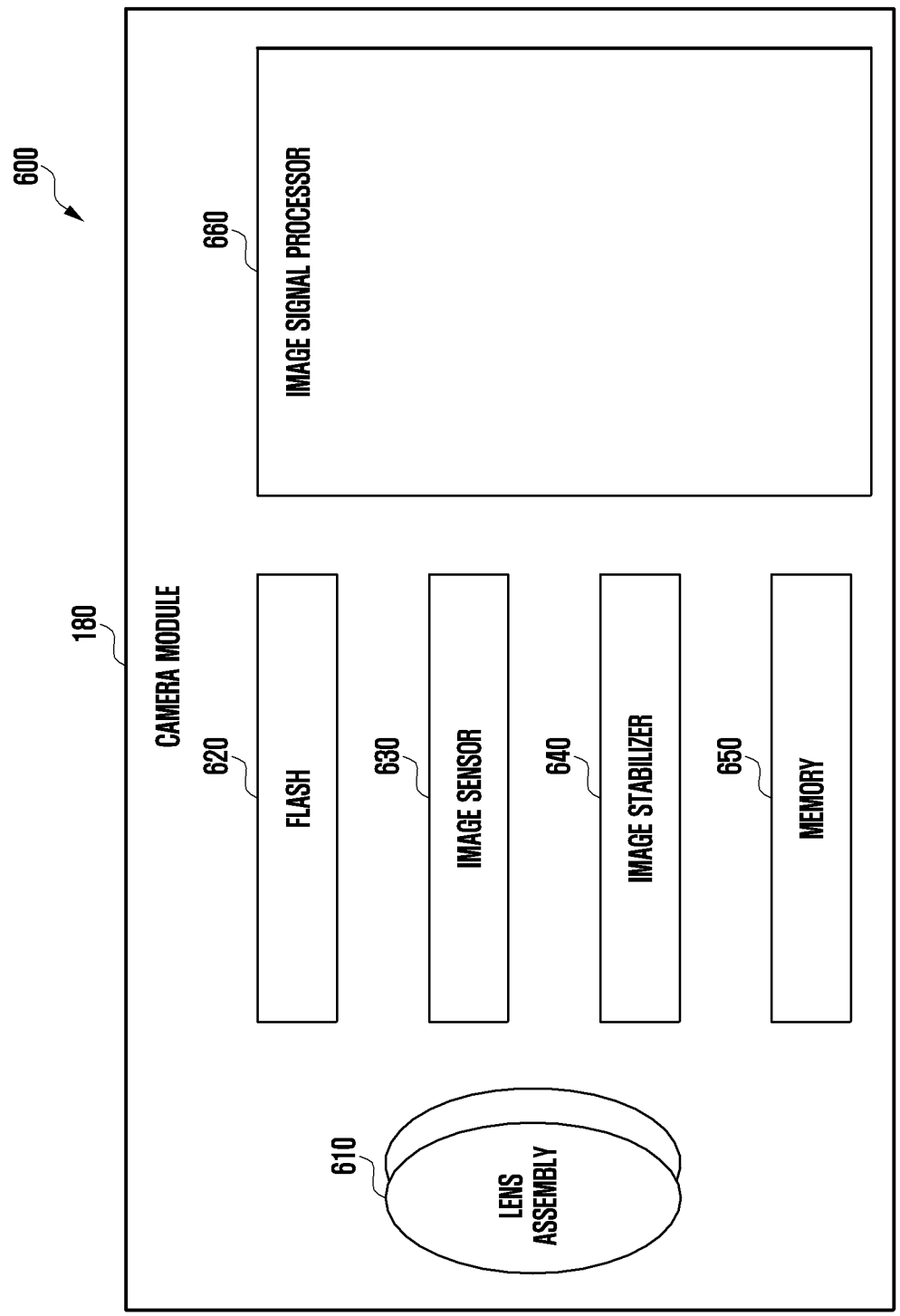
FIG. 6 is a block diagram illustrating a camera module according to an embodiment of the disclosure.

FIG. 6 is a block diagram illustrating a camera module according to an embodiment of the disclosure.

Referring to FIG. 6, in the block diagram 600, the camera module 180 may include a lens assembly 610, a flash 620, an image sensor 630, an image stabilizer 640, a memory 650 (e.g., a buffer memory), and/or an image signal processor 660. The lens assembly 610 may collect light reflected from an object which is a target to be image-captured. The lens assembly 610 may include one or more lenses. According to an embodiment, the camera module 180 may include a plurality of the lens assemblies 610. The camera module 180 may be, for example, a dual camera, a 360-degree camera, or a spherical camera. The plurality of lens assemblies 610 may have the same lens attributes (e.g., a view angle, a focal length, an auto focus, an f-number, and/or an optical zoom), or at least one lens assembly may have one or more lens attributes different from those of the other lens assemblies. The lens assembly 610 may include, for example, a wide-angle lens or a telephoto lens. The flash 620 may emit light to enhance light reflected from the object. The flash 620 may include one or more light emitting diodes (LEDs) (e.g., a red-green-blue (RGB) LED, a white LED, an infrared (IR) LED, or an ultraviolet (UV) LED) or a xenon lamp.

According to various embodiments, the image sensor 630 may convert light, collected from the object through the lens assembly 610, into an electrical signal and thereby acquire an image corresponding to the object. According to an embodiment, the image sensor 630 may include one image sensor selected from image sensors having different attributes, such as an RGB sensor, a black-and-white (BW) sensor, an IR sensor, or a UV sensor, a plurality of image sensors having the same attributes, or a plurality of image sensors having different attributes. The image sensor 630 may be implemented as, for example, a charged coupled device (CCD) sensor or a complementary metal oxide semiconductor (CMOS) sensor. According to an embodiment, the image sensor 630 may correct, at least in part, an image captured through the camera module 180. For example, the image sensor 630 may switch the left/right or top/bottom of the captured image. According to an embodiment, the image sensor 630 may be a plurality of image sensors and may include a first image sensor corresponding to a front camera (e.g., the front camera module 205 in FIG. 2) included in the camera module 180 and/or a second image sensor corresponding to a rear camera (e.g., the rear camera module 212 in FIG. 2).

According to various embodiments, in response to a movement of the camera module 180 or the electronic device 101, the image stabilizer 640 may move the image sensor 630 or at least one lens included in the lens assembly 610 in a particular direction or control it (e.g., adjust a read-out timing) so as to at least partially compensate for a negative effect (e.g., image blurring) by the movement on an image being captured. According to an embodiment, the image stabilizer 640 may be implemented as, for example, an optical image stabilizer and may detect the movement of the electronic device 200 by using a gyro sensor (not shown) or an acceleration sensor (not shown) disposed inside or outside the camera module 180. According to an embodiment, the image stabilizer 640 may identify the read-out timing for correcting a rolling shutter (RS) by using the gyro sensor or the acceleration sensor and, based on the identified read-out timing, perform the RS correction.

According to various embodiments, in correcting a captured image, the electronic device 200 may perform a motion correction based on the top/bottom or left/right switching of the captured image and/or an RS correction based on the read-out timing.

According to various embodiments, the memory 650 may store, at least temporarily, at least a part of an image acquired through the image sensor 630 for a subsequent image processing task. For example, if image acquisition is delayed due to shutter lag, or if multiple images are quickly acquired, the acquired original image (e.g., a high-resolution image) may be stored in the memory 650, and a corresponding copy image (e.g., a low-resolution image) may be previewed through the display 201 (e.g., the display device 160 in FIG. 1). According to an embodiment, the electronic device 200 may capture a first image by using at least one camera (e.g., the front camera and/or the rear camera) and store the first image in the memory 650. The electronic device 200 may identify an EXIF value corresponding to the at least one camera and correct the first image into a second image, based on the EXIF value. The electronic device 200 may store the second image in the memory 650. According to an embodiment, when a specified condition is satisfied (e.g., when a predetermined user input or system command is received), the electronic device 200 may acquire and process at least a part of the original image, stored in the memory 650, through the image signal processor 660. According to an embodiment, the memory 650 may be configured as at least a part of the memory 130 shown in FIG. 1 or as a separate memory that is operated independently from the memory 130.

According to various embodiments, the image signal processor 660 may perform image processing on an image acquired through the image sensor 630 or an image stored in the memory 650. The image processing may include, for example, depth map generation, three-dimensional (3D) modeling, panorama generation, feature point extraction, image synthesizing, and/or image compensation (e.g., noise reduction, resolution adjustment, brightness adjustment, blurring, sharpening, or softening). Additionally or alternatively, the image signal processor 660 may perform control (e.g., exposure time control or read-out timing control) for at least one component (e.g., the image sensor 630) included in the camera module 180. An image processed by the image signal processor 660 may be stored again in the memory 650 for further processing or delivered to an external component (e.g., the memory 130, the display device 160, the electronic device 102, the electronic device 104, or the server 108) outside the camera module 180. According to an embodiment, although not shown, the image signal processor 660 may be configured as at least a part of the processor 120 or as a separate processor that is operated independently from the processor 120 and the camera module 180. In the latter case, an image processed by the image signal processor 660 may be stored in the memory 650 as it is or after being further processed by the processor 120. An image stored in the memory 650 may be displayed through the display device 160. According to an embodiment, the image signal processor 660 may correct an image captured through at least one camera and store the corrected image in the memory 650. According to an embodiment, the image signal processor 660 may identify a set EXIF value corresponding to the camera module 180 and, based on the identified EXIF value, perform top/bottom/left/right switching of a captured image.

According to an embodiment, the electronic device 200 may include two or more camera modules 180 having different attributes or functions. In this case, at least one camera module may be a wide-angle camera or a front camera, and the other camera module(s) may be a telephoto camera or a rear camera. According to an embodiment, the camera module 180 may include a front camera (e.g., the front camera module 205 in FIG. 2) disposed on the front surface of the electronic device 200 and a rear camera (e.g., the rear camera module 212 in FIG. 2) disposed on the rear surface of the electronic device 200.

According to various embodiments, a flip direction (e.g., a vertical flip and/or a horizontal flip) for the electronic device 200 may be changed corresponding to a mounting direction of the image sensor 630. Specifically, when the mounting direction of the image sensor 630 is changed, an axis for flipping an image may be changed, and thus the flip direction for the electronic device 200 may also be changed. For example, when the image sensor 630 is mounted after being rotated by about 90 degrees, the electronic device 200 may perform a vertical flip based on Y-axis motion information instead of performing a vertical flip based on X-axis motion information. In an embodiment disclosed herein, the electronic device 200 performs a vertical flip and then performs a horizontal flip in response to switching from the front camera module 205 to the rear camera module 212, but this flip sequence is only an example. According to an embodiment, a flip direction of an image may be varied depending on the mounting direction of the image sensor 630.

According to various embodiments, an electronic device (e.g., the electronic device 101 in FIG. 1 or the electronic device 200 in FIG. 2) may include a housing (e.g., the housing 210 in FIG. 2) including a front plate (e.g., the front plate 202 in FIG. 2), a rear plate (e.g., the rear plate 211 in FIG. 2) opposed to and spaced apart from the front plate 202, and a lateral member (e.g., the lateral member 218 in FIG. 2) surrounding a space between the front plate 202 and the rear plate 211; a camera module (e.g., the camera module 180 in FIG. 1) including a first camera (e.g., the first camera module 205 in FIG. 2) disposed in the space and performing shooting based on a first direction corresponding to the front plate 202, a second camera (e.g., the second camera module 212 in FIG. 3) disposed in the space and performing shooting based on a second direction corresponding to the rear plate 211, and an image signal processor (e.g., the image signal processor 660 in FIG. 6) for correcting images captured using at least one of the first camera module 205 or the second camera module 212; a memory (e.g., the memory 130 in FIG. 1); a gyro sensor; and/or a processor (e.g., the processor 120 in FIG. 1) operatively connected to the camera module 180, the memory 130, and the gyro sensor.

According to various embodiments, the processor 120 may be configured to control at least one of the first camera module 205 or the second camera module 212 to capture images, to identify a camera switching command while capturing the images, to acquire gyro motion information through the gyro sensor in response to the camera switching command, and to control the image signal processor 660 to correct the captured images, based on the acquired gyro motion information.

According to an embodiment, the gyro motion information may include X-axis motion information, Y-axis motion information, and Z-axis motion information, and the processor 120 may be further configured to perform a vertical flip for the images, based on the Y-axis motion information and the Z-axis motion information, and to perform a horizontal flip for the images, based on the X-axis motion information and the Z-axis motion information.

According to an embodiment, the processor 120 may be further configured to, in case of performing the vertical flip for the images, change a motion direction for the Y-axis motion information and the Z-axis motion information, and to correct the images by vertically flipping the images, based on the changed motion direction.

According to an embodiment, the processor 120 may be further configured to, in case of performing the horizontal flip for the images, change a motion direction for the X-axis motion information and the Z-axis motion information, and to correct the images by horizontally flipping the images, based on the changed motion direction.

According to an embodiment, the processor 120 may be further configured to determine whether an option for cap-turing the images as previewed is activated, and to perform the horizontal flip for the images when the option is activated.

According to various embodiments, the X-axis motion information may include motion direction information corresponding to an X-axis of coordinates, the Y-axis motion information may include motion direction information corresponding to a Y-axis of the coordinates, and the Z-axis motion information may include rotation information corresponding to a Z-axis of the coordinates.

Figure 7:
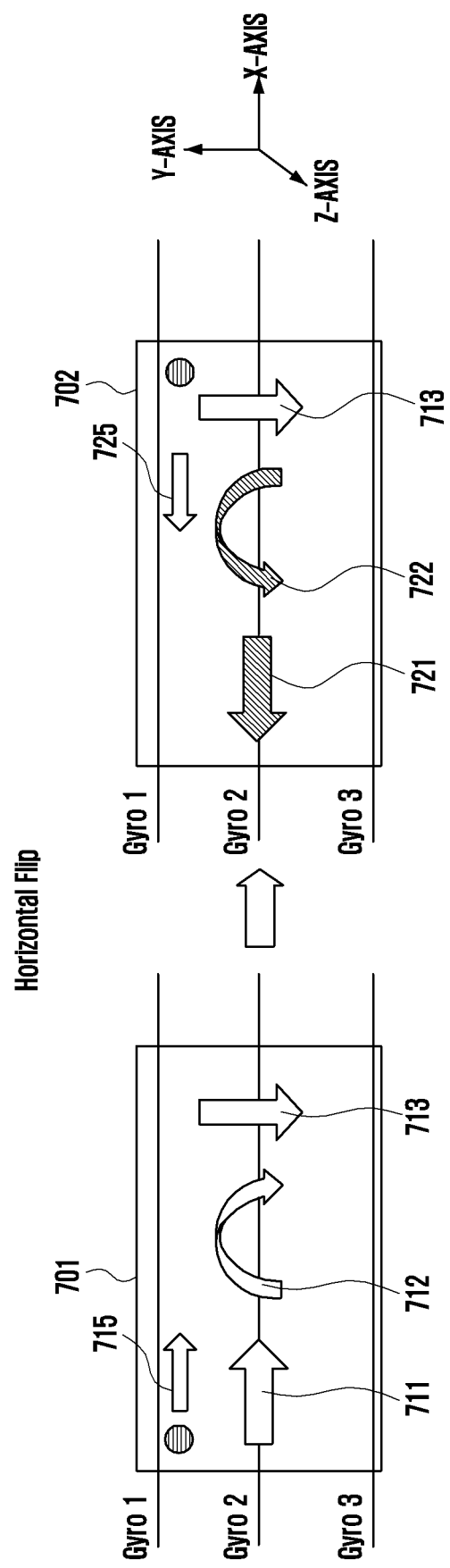
FIG. 7 is a diagram illustrating a change in a read-out direction during a horizontal flip of an image according to an embodiment of the disclosure.

FIG. 7 is a diagram illustrating a change in a read-out direction during a horizontal flip of an image according to an embodiment of the disclosure.

Referring to FIG. 7, when capturing an image by using a camera module (e.g., the camera module 180 in FIG. 1), a processor (e.g., the processor 120 in FIG. 1) of an electronic device (e.g., the electronic device 101 in FIG. 1) may perform a horizontal flip (e.g., left/right switching) of the captured image. For example, the horizontal flip may be an operation of switching the left/right of an image. According to an embodiment, the processor 120 may perform the horizontal flip of a first image 701 captured through the camera module 180 and thereby generate a second image 702. The processor 120 may store the generated second image 702 in a memory (e.g., the memory 130 in FIG. 1). The processor 120 may display the second image 702 through a display (e.g., the display device 160 in FIG. 1). According to an embodiment, the processor 120 may store the first image 701 or the second image 702 in the memory 130.

According to an embodiment, the processor 120 may acquire gyro motion information about the first image 701 (e.g., motion information 711 about the X-axis, motion information 713 about the Y-axis, and/or rotation information 712 about the Z-axis). For example, the motion information 711 about the X-axis may include motion direction information (e.g., from left to right, from right to left) corresponding to the X-axis of the coordinates, and the motion information 713 about the Y-axis may include motion direction information (e.g., from top to bottom, from bottom to top) corresponding to the Y-axis of the coordinates.

According to an embodiment, the processor 120 may display the first image 701 on the display device 160, based on the gyro motion information. Specifically, the processor 120 may identify a read-out direction 715 and/or a read-out order for the first image 701, based on the gyro motion information. The read-out direction may include direction information on whether to output an image from left to right or from right to left. The read-out order may include order information on whether to output an image from top to bottom or from bottom to top. According to an embodiment, the processor 120 may determine the read-out direction 715 for the first image 701 as a first direction (e.g., from left to right), based on the motion information 711 about the X-axis. In addition, based on the motion information 713 about the Y-axis, the processor 120 may identify that the read-out order for the first image 701 is from top to bottom. According to an embodiment, based on the rotation information 712 about the Z-axis included in the gyro motion information, the processor 120 may identify whether a horizontal flip (e.g., rotation to reverse the left/right of an image around the Y-axis) or a vertical flip (e.g., rotation to reverse the top/bottom of an image around the X-axis) has occurred for the first image 701. A change in the rotation information 712 about the Z-axis means that at least one of the horizontal flip or the vertical flip has occurred for an image.

According to an embodiment, the processor 120 may convert the first image 701 into the second image 702 in response to a horizontal flip command for the captured image. According to an embodiment, the horizontal flip command may change the motion information 711 about the X-axis and the rotation information 712 about the Z-axis in the gyro motion information. For example, the processor 120 may change the gyro motion information about the first image 701 to the gyro motion information about the second image 702. According to an embodiment, in case of the horizontal flip, the processor 120 may change the read-out direction to the opposite direction. For example, when the read-out direction is a first read-out direction 715 (e.g., from left to right), the read-out direction may be changed to a second read-out direction 725 (e.g., from right to left) upon reception of the horizontal flip command. According to an embodiment, in response to the horizontal flip command, the processor 120 may change the motion information 711 about the X-axis and the rotation information 712 about the Z-axis in opposite directions.

According to an embodiment, the processor 120 may acquire gyro motion information about the second image 702 (e.g., motion information 721 about the X-axis, motion information 713 about the Y-axis, and/or rotation information 722 about the Z-axis). According to an embodiment, compared to those of the gyro motion information about the first image 701, the motion information 721 about the X-axis and the rotation information 722 about the Z-axis may be changed in the gyro motion information about the second image 702. According to an embodiment, in response to the horizontal flip command, the processor 120 may change the gyro motion information about the first image 701 to the gyro motion information about the second image 702 and also display the second image 702 on the display device 160. For example, the processor 120 may determine the read-out direction 725 for the second image 702 as a second direction (e.g., from right to left), based on the motion information 721 about the X-axis. In addition, based on the motion information 713 about the Y-axis, the processor 120 may identify that the read-out order for the second image 702 is from top to bottom.

According to an embodiment, the electronic device 101 may perform the horizontal flip for an image by controlling an image signal processor (e.g., the image signal processor 660 in FIG. 6) of the camera module 180.

According to another embodiment, the electronic device 101 may perform the horizontal flip for an image by controlling an application processor (AP).

Figure 8:
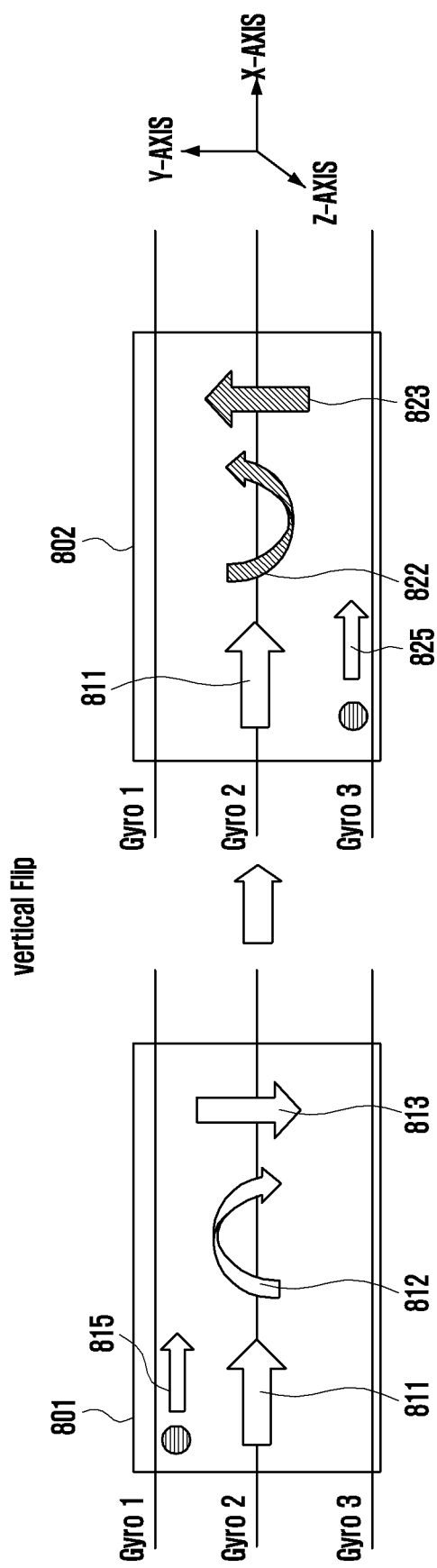
FIG. 8 is a diagram illustrating a change in a read-out direction during a vertical flip of an image according to an embodiment of the disclosure.

FIG. 8 is a diagram illustrating a change in a read-out direction during a vertical flip of an image according to an embodiment of the disclosure.

Referring to FIG. 8, when capturing an image by using a camera module (e.g., the camera module 180 in FIG. 1), a processor (e.g., the processor 120 in FIG. 1) of an electronic device (e.g., the electronic device 101 in FIG. 1) may perform a vertical flip (e.g., top/bottom switching) of the captured image. For example, the vertical flip may be an operation of switching the top/bottom of an image. According to an embodiment, the processor 120 may perform the vertical flip of a first image 801 captured through the camera module 180 and thereby generate a second image 802. The processor 120 may store the generated second image 802 in a memory (e.g., the memory 130 in FIG. 1). The processor 120 may display the second image 802 through a display (e.g., the display device 160 in FIG. 1). According to an embodiment, the processor 120 may store the first image 801 or the second image 802 in the memory 130.

According to an embodiment, the processor 120 may acquire gyro motion information about the first image 801 (e.g., motion information 811 about the X-axis, motion information 813 about the Y-axis, and/or rotation information 812 about the Z-axis). According to an embodiment, the processor 120 may display the first image 801 on the display device 160, based on the acquired gyro motion information. Specifically, the processor 120 may identify a read-out direction 815 and/or a read-out order for the first image 801, based on the gyro motion information. The read-out direction may include direction information on whether to output an image from left to right or from right to left. The read-out order may include order information on whether to output an image from top to bottom or from bottom to top. According to an embodiment, the processor 120 may determine the read-out direction 815 for the first image 801 as a first direction (e.g., from left to right), based on the motion information 811 about the X-axis. In addition, based on the motion information 813 about the Y-axis, the processor 120 may identify that the read-out order for the first image 801 is from top 815 to bottom 825. According to an embodiment, based on the rotation information 812 about the Z-axis included in the gyro motion information, the processor 120 may identify whether a horizontal flip (e.g., rotation to reverse the left/right of an image around the Y-axis) or a vertical flip (e.g., rotation to reverse the top/bottom of an image around the X-axis) has occurred for the first image 801. A change in the rotation information 812 about the Z-axis means that at least one of the horizontal flip or the vertical flip has occurred for an image.

According to an embodiment, the processor 120 may convert the first image 801 into the second image 802 in response to a vertical flip command for the captured image. According to an embodiment, the vertical flip command may change the motion information 813 about the Y-axis and the rotation information 812 about the Z-axis in the gyro motion information. For example, the processor 120 may change the gyro motion information about the first image 801 to the gyro motion information about the second image 802. According to an embodiment, in case of the vertical flip, the processor 120 may change the read-out order to the opposite order. For example, when the read-out order is a first direction (e.g., from top to bottom), the read-out order may be changed to a second direction (e.g., from bottom to top) upon reception of the vertical flip command According to an embodiment, in response to the vertical flip command, the processor 120 may change the motion information 813 about the Y-axis and the rotation information 812 about the Z-axis in opposite directions.

According to an embodiment, the processor 120 may acquire gyro motion information about the second image 802 (e.g., motion information 811 about the X-axis, motion information 823 about the Y-axis, and/or rotation information 822 about the Z-axis). According to an embodiment, compared to those of the gyro motion information about the first image 801, the motion information 823 about the Y-axis and the rotation information 822 about the Z-axis may be changed in the gyro motion information about the second image 802. According to an embodiment, in response to the vertical flip command, the processor 120 may change the gyro motion information about the first image 801 to the gyro motion information about the second image 802 and also display the second image 802 on the display device 160. For example, the processor 120 may determine the read-out order for the second image 802 as a second direction (e.g., from bottom to top), based on the motion information 823 about the Y-axis. In addition, based on the motion information 811 about the X-axis, the processor 120 may identify that the read-out direction for the second image 802 is from left to right.

Figure 9:
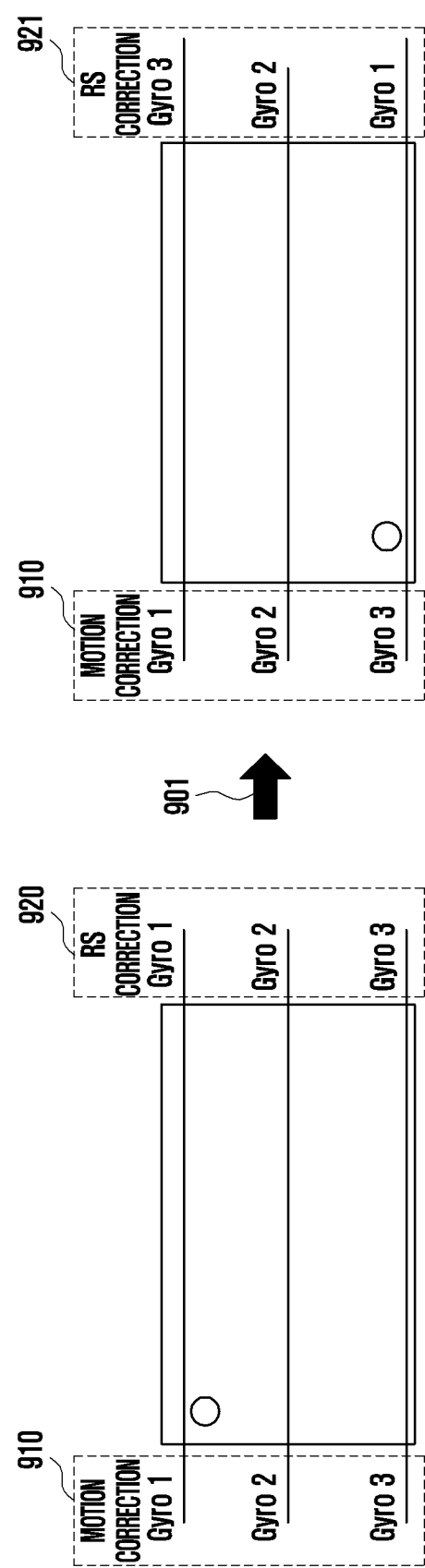
FIG. 9 is a diagram illustrating a change in order of gyro data for correcting a rolling shutter (RS) in switching between front and rear cameras according to an embodiment of the disclosure.

FIG. 9 is a diagram illustrating a change in order of gyro data for correcting a rolling shutter (RS) in switching between front and rear cameras according to an embodiment of the disclosure.

According to various embodiments, an electronic device (e.g., the electronic device 101 in FIG. 1) may correct an image by using one of an image signal processor (ISP) (e.g., the image signal processor 660 in FIG. 6) included in a camera module (e.g., the camera module 180 in FIG. 1) or an application processor (AP) (e.g., the main processor 121 in FIG. 1). According to an embodiment, in switching between the front and rear cameras, one of the image signal processor 660 or the application processor may correct, at least in part, an image captured through the camera module 180. According to an embodiment, the image signal processor 660 may control a plurality of image sensors that may include a first image sensor corresponding to the front camera and a second image sensor corresponding to the rear camera. According to an embodiment, when the front camera captures an image, the first image sensor may correct the image captured by the front camera. If camera switching is made from the front camera to the rear camera, the second image sensor may correct an image captured by the rear camera.

According to an embodiment, when an image is corrected by the image signal processor 660, the image signal processor 660 may identify a read-out direction (e.g., from left to right, from right to left) and a read-out order (e.g., from top to bottom, from bottom to top), based on gyro motion information. According to an embodiment, the image signal processor 660 may display an image corrected based on the read-out direction and the read-out order. According to an embodiment, the image correction by the image signal processor 660 may be performed in consideration of only the read-out direction and the read-out order. According to an embodiment, the image signal processor 660 may perform a motion correction 910 based on the gyro motion information.

According to an embodiment, when an image is corrected by the application processor, the application processor may perform both the motion correction 910 based on the gyro motion information and a rolling shutter (RS) correction 920 based on gyro data. For example, the gyro data may include an RS correction value, and the RS correction value may include timing information of a read-out performed for each line when corrected images are generated. For example, the corrected image may be displayed/outputted for each line, based on the read-out timing corresponding to each line. According to an embodiment, the application processor may perform the RS correction 920 based on the gyro data including the RS correction value so that the image is not distorted. According to an embodiment, the application processor may change the order of the gyro data and perform the RS correction 921.

Referring to FIG. 9, the electronic device 101 may perform both the motion correction 910 and the RS correction 920 when generating an image in case of camera switching between the front and rear cameras. For example, the motion correction 910 may be performed to switch the left/right/top/bottom of an image, based on gyro motion information (e.g., motion information about the X-axis, motion information about the Y-axis, and/or rotation information about the Z-axis). The motion correction 910 may include a horizontal flip for switching the left/right of an image, based on the motion information about the X-axis and the rotation information about the Z-axis, and/or a vertical flip for switching the top/bottom of an image, based on the motion information about the Y-axis and the rotation information about the Z-axis. The RS correction 920 may be performed to correct an image, based on a read-out timing included in gyro data, so that the image is not distorted. According to an embodiment, the RS correction 920 may change the order of read-out timing included in the gyro data to the reverse order and display an image in accordance with the changed order of read-out timing.

According to an embodiment, the electronic device 101 may perform the motion correction under the control of the image signal processor 660 of the camera module 180. According to an embodiment, the electronic device 101 may perform both the motion correction and the RS correction under the control of the application processor (e.g., the image signal processor 660 in FIG. 6).

According to various embodiments, an electronic device (e.g., the electronic device 101 in FIG. 1 or the electronic device 200 in FIG. 2) may include a housing (e.g., the housing 210 in FIG. 2) including a front plate (e.g., the front plate 202 in FIG. 2), a rear plate (e.g., the rear plate 211 in FIG. 2) opposed to and spaced apart from the front plate 202, and a lateral member (e.g., the lateral member 218 in FIG. 2) surrounding a space between the front plate 202 and the rear plate 211; a first camera (e.g., the first camera module 205 in FIG. 2) disposed in the space and performing shooting based on a first direction corresponding to the front plate 202; a second camera (e.g., the second camera module 212 in FIG. 3) disposed in the space and performing shooting based on a second direction corresponding to the rear plate 211; a memory (e.g., the memory 130 in FIG. 1); a gyro sensor; and an application processor (e.g., the processor 120 in FIG. 1) operatively connected to the first camera module 205, the second camera module 212, the memory 130, and the gyro sensor, and correcting images captured using at least one of the first camera module 205 or the second camera module 212.

According to various embodiments, the application processor 120 may be configured to control at least one of the first camera module 205 or the second camera module 212 to capture images, to identify a camera switching command while capturing the images, to acquire gyro motion information through the gyro sensor in response to the camera switching command, to calculate a rolling shutter (RS) correction value corresponding to the acquired gyro motion information, and to correct the captured images, based on the acquired gyro motion information and the calculated RS correction value.

According to an embodiment, the gyro motion information may include X-axis motion information, Y-axis motion information, and Z-axis motion information, and the application processor may be further configured to perform a vertical flip for the images, based on the Y-axis motion information and the Z-axis motion information, and to perform a horizontal flip for the images, based on the X-axis motion information and the Z-axis motion information.

According to an embodiment, the application processor may be further configured to, in case of performing the vertical flip for the images, change a motion direction for the Y-axis motion information and the Z-axis motion information, and to correct the images by vertically flipping the images, based on the changed motion direction and the calculated RS correction value.

According to an embodiment, the application processor may be further configured to, in case of performing the horizontal flip for the images, change a motion direction for the X-axis motion information and the Z-axis motion information, and to correct the images by horizontally flipping the images, based on the changed motion direction and the calculated RS correction value.

According to an embodiment, the application processor is further configured to determine whether an option for capturing the images as previewed is activated, and to perform the horizontal flip for the images when the option is activated.

Figure 10:
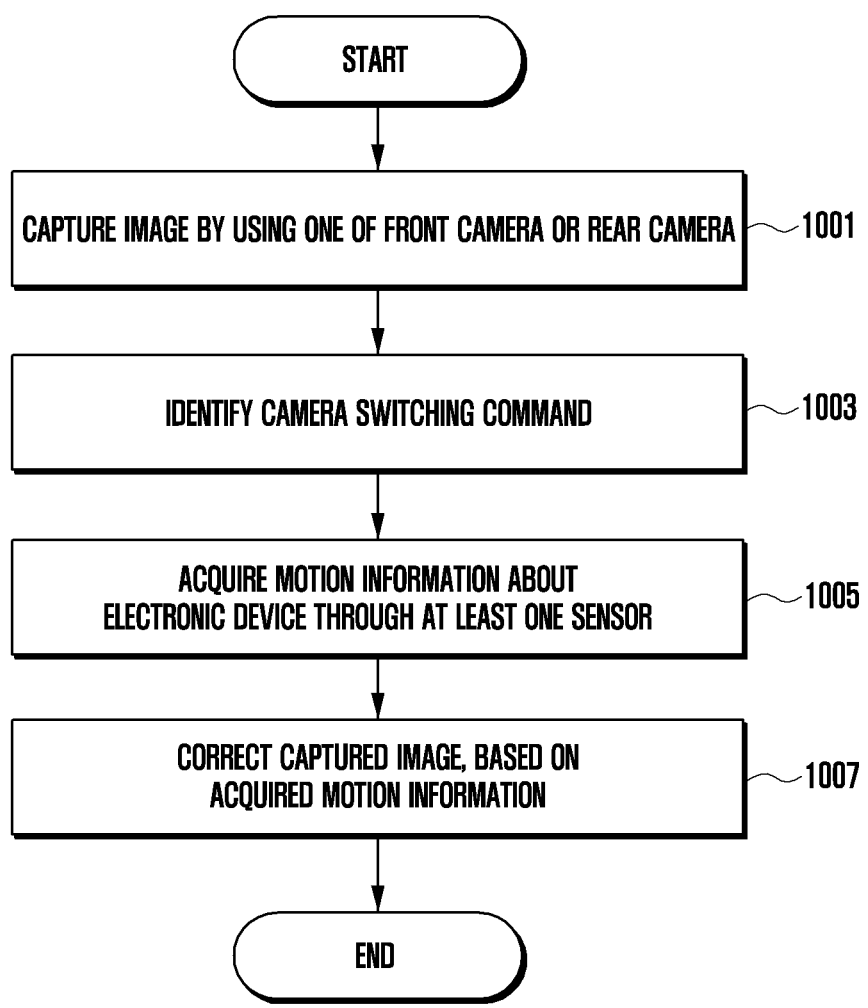
FIG. 10 is a flow diagram illustrating a method of correcting an image in camera switching according to an embodiment of the disclosure.

FIG. 10 is a flow diagram illustrating a method of correcting an image in camera switching according to an embodiment of the disclosure.

Referring to FIG. 10, at operation 1001, a processor (e.g., the processor 120 in FIG. 1) of an electronic device (e.g., the electronic device 101 in FIG. 1) may control one of a front camera (e.g., the front camera module 205 in FIG. 2) or a rear camera (e.g., the rear camera module 212 in FIG. 3) to capture images (e.g., moving images). Specifically, the electronic device 101 may execute a camera-related application, select one of the front camera module 205 or the rear camera module 212 through the camera-related application, and control the selected camera to capture images. For example, the electronic device 101 may identify an EXIF value corresponding to the selected camera and, based on the identified EXIF value, correct the captured images.

At operation 1003, the electronic device 101 may identify a camera switching command. For example, the camera switching command may refer to a command of switching from the front camera module 205 to the rear camera module 212 or a command of switching from the rear camera module 212 to the front camera module 205. For example, the electronic device 101 may identify the camera switching command from a user input. According to an embodiment, the electronic device 101 may receive the camera switching command while capturing images. The captured images may be stored in a memory (e.g., the memory 130 in FIG. 1) of the electronic device 101.

At operation 1005, in response to the camera switching command, the electronic device 101 may acquire motion information (e.g., X-axis motion information, Y-axis motion information, and/or Z-axis motion (rotation) information) about the electronic device 101 through at least one sensor (e.g., a gyro sensor or an acceleration sensor). For example, the electronic device 101 may acquire angle information (e.g., posture information and/or direction information) about the electronic device 101.

At operation 1007, the electronic device 101 may correct the captured image, based on the acquired motion information. Specifically, the electronic device 101 may determine one of the front camera module 205 or the rear camera module 212 in response to the camera switching command. Then the electronic device 101 may correct images captured through the determined camera, based on the acquired motion information. For example, the electronic device 101 may perform a vertical flip or horizontal flip of the captured images and also perform an image stabilization of the captured images. In addition, the electronic device 101 may perform a rolling shutter (RS) correction on the captured images. According to an embodiment, in response to the camera switching command, the electronic device 101 may correct the captured images to meet a user's intention. According to an embodiment, the electronic device 101 may have an option for capturing images as previewed (e.g., a "save as previewed" option). In this case, the electronic device 101 may determine whether the option for capturing images as previewed is activated. If the option is activated, the electronic device 101 may perform the horizontal flip of the captured images.

Although not shown, the electronic device 101 may store the corrected images in a memory (e.g., the memory 130 in FIG. 1). Also, the electronic device 101 may display the corrected images through a display (e.g., the display device 160 in FIG. 1). For example, the electronic device 101 may determine a procedure for outputting images, based on the motion information acquired at the operation 1005, and display the corrected images in accordance with the determined procedure.

Figure 11:
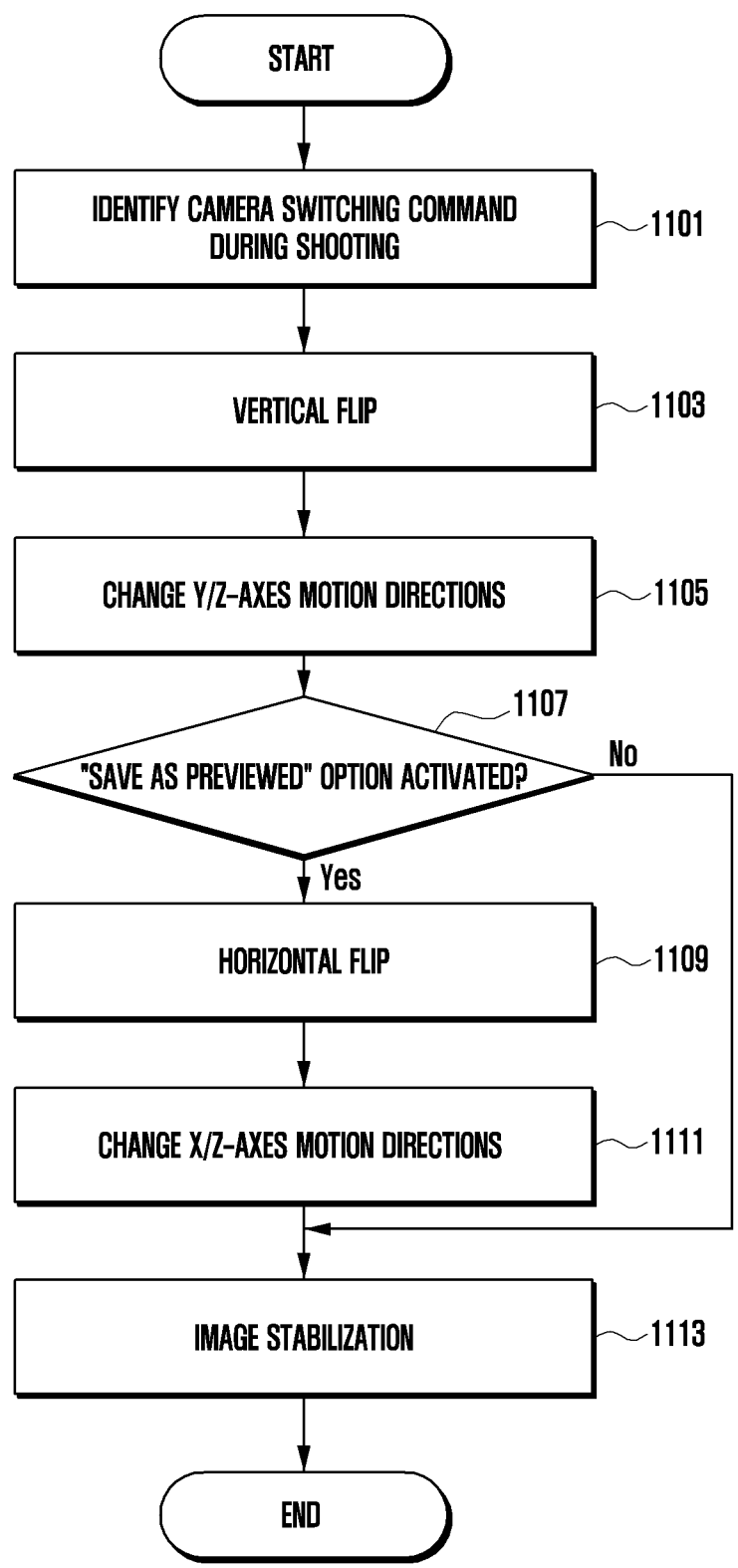
FIG. 11 is a flow diagram illustrating a method of correcting an image through an image signal processor of a camera module according to an embodiments of the disclosure.

FIG. 11 is a flow diagram illustrating a method of correcting an image through an image signal processor of a camera module according to an embodiment of the disclosure. That is, FIG. 11 illustrates a process of performing a motion correction under the control of the image signal processor of the camera module in an electronic device.

Referring to FIG. 11, at operation 1101, a processor (e.g., the processor 120 in FIG. 1) of an electronic device (e.g., the electronic device 101 in FIG. 1) may identify a camera switching command for front and rear cameras during shooting. For example, while capturing images by using one of a front camera (e.g., the front camera module 205 in FIG. 2) or a rear camera (e.g., the rear camera module 212 in FIG. 3), the electronic device 101 may identify the camera switching command for the front/rear cameras. For example, the electronic device 101 may execute a camera-related application and identify a camera switching command for the front and rear cameras through the camera-related application.

At operation 1103, in response to the camera switching command, an image signal processor (e.g., the image signal processor 660 in FIG. 6) included in a camera module (e.g., the camera module 180 in FIG. 1) of the electronic device 101 may perform a vertical flip for a corrected image (e.g., a second image) of a first image being captured through the camera module 180. For example, the image signal processor 660 may acquire gyro motion information about the first image (e.g., motion information about the X-axis, motion information about the Y-axis, and/or motion information about the Z-axis). The gyro motion information may include motion information corresponding to the front camera module 205 and motion information corresponding to the rear camera module 212 and may be stored in a memory (e.g., the memory 130 in FIG. 1) of the electronic device 101.

At operation 1105, the image signal processor 660 may change directions of the Y-axis motion information and the Z-axis motion information included in the gyro motion information. According to an embodiment, when performing the vertical flip for images, the image signal processor 660 may change the directions of the Y-axis motion information and the Z-axis motion information (e.g., Z-axis rotation information) included in the gyro motion information. For example, when the Y-axis motion information has a first direction from top to bottom, the image signal processor 660 may change the first direction of the Y-axis motion information to a second direction from bottom to top by the vertical flip. The vertical flip may be an operation of changing each direction of the Y-axis motion information and the Z-axis motion information from a predetermined direction to the opposite direction. The image signal processor 660 may change each direction of the Y-axis motion information and the Z-axis motion information to the reverse direction (i.e., the opposite direction).

At operation 1107, the electronic device 101 may determine whether a "save as previewed" option is activated. In general, when the electronic device 101 captures a first image and generates a corrected image (second image), the left/right of an object may be switched. Thus, when the "save as previewed" option is activated, the image signal processor 660 may perform a horizontal flip for the image at operation 1109. If the "save as previewed" option is not activated, the electronic device 101 may skip the horizontal flip.

At operation 1109, the image signal processor 660 may perform the horizontal flip for the corrected image (second image) of the first image being captured through the camera module 180.

At operation 1111, the image signal processor 660 may change directions of the X-axis motion information and the Z-axis motion information included in the gyro motion information. According to an embodiment, when performing the horizontal flip for images, the image signal processor 660 may change the directions of the X-axis motion information and the Z-axis motion information (e.g., Z-axis rotation information) included in the gyro motion information. For example, when the X-axis motion information has a first direction from left to right, the image signal processor 660 may change the first direction of the X-axis motion information to a second direction from right to left by the horizontal flip. The horizontal flip may be an operation of changing each direction of the X-axis motion information and the Z-axis motion information from a predetermined direction to the opposite direction. The image signal processor 660 may change each direction of the X-axis motion information and the Z-axis motion information to the reverse direction (i.e., the opposite direction).

At operation 1113, the electronic device 101 may perform an image stabilization such as a video digital image stabilization (VDIS). The image stabilization may be an operation of reducing/correcting image blurring due to camera shake.

According to various embodiments, the electronic device 101 may perform the vertical flip and/or the horizontal flip under the control of the image signal processor 660. According to an embodiment, the image signal processor 660 may perform only a motion correction without an RS correction in camera switching. For example, the motion correction may include the vertical flip of switching the top/bottom of images and/or the horizontal flip of switching the left/right of images.

Figure 12:
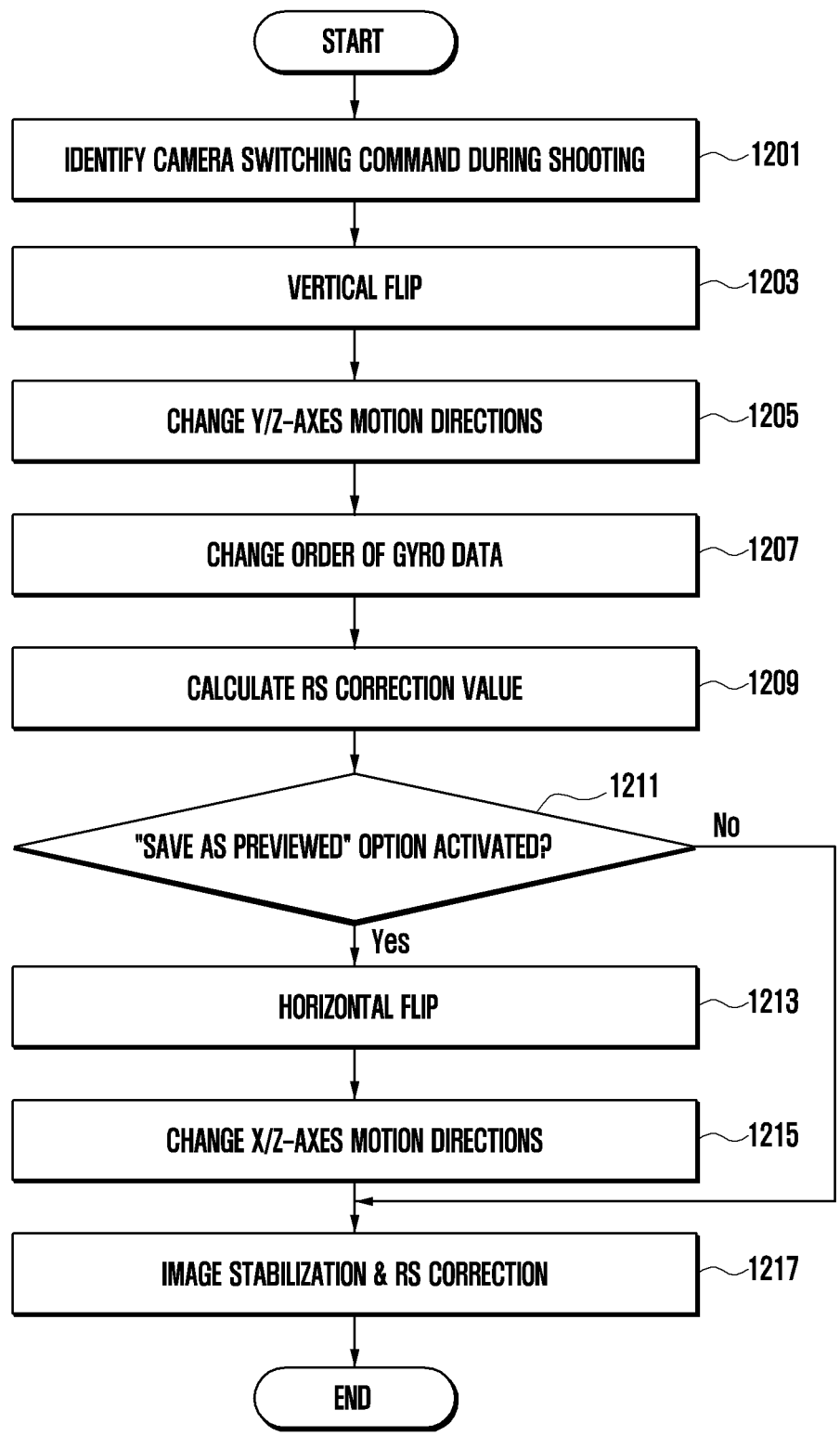
FIG. 12 is a flow diagram illustrating a method of correcting an image through an application processor according to an embodiment of the disclosure.

FIG. 12 is a flow diagram illustrating a method of correcting an image through an application processor according to an embodiment of the disclosure. That is, FIG. 12 illustrates a process of performing a motion correction (e.g., a vertical flip and/or a horizontal flip) and/or a rolling shutter (RS) correction under the control of the application processor in an electronic device.

Referring to FIG. 12, at operation 1201, a processor (e.g., the processor 120, e.g., the application processor (AP), in FIG. 1) of an electronic device (e.g., the electronic device 101 in FIG. 1) may identify a camera switching command for front and rear cameras during shooting. For example, while capturing images by using one of a front camera (e.g., the front camera module 205 in FIG. 2) or a rear camera (e.g., the rear camera module 212 in FIG. 3), the electronic device 101 may identify the camera switching command for the front/rear cameras. For example, the electronic device 101 may execute a camera-related application and identify a camera switching command for the front and rear cameras through the camera-related application.

At operation 1203, in response to the camera switching command, the processor 120 (e.g., the application processor) may perform a vertical flip for a corrected image (e.g., a second image) of a first image being captured through a camera module (e.g., the camera module 180 in FIG. 1). For example, the processor 120 may acquire gyro motion information about the first image (e.g., motion information about the X-axis, motion information about the Y-axis, and/or motion information about the Z-axis). The gyro motion information may include motion information corresponding to the front camera module 205 and motion information corresponding to the rear camera module 212 and may be stored in a memory (e.g., the memory 130 in FIG. 1) of the electronic device 101.

At operation 1205, the processor 120 may change directions of the Y-axis motion information and the Z-axis motion information included in the gyro motion information. According to an embodiment, when performing the vertical flip for images, the processor 120 may change the directions of the Y-axis motion information and the Z-axis motion information (e.g., Z-axis rotation information) included in the gyro motion information. For example, when the Y-axis motion information has a first direction from top to bottom, the image signal processor 660 may change the first direction of the Y-axis motion information to a second direction from bottom to top by the vertical flip. The vertical flip may be an operation of changing each direction of the Y-axis motion information and the Z-axis motion information from a predetermined direction to the opposite direction. The image signal processor 660 may change each direction of the Y-axis motion information and the Z-axis motion information to the reverse direction (i.e., the opposite direction).

At operation 1207, the electronic device 101 may change the order of gyro data under the control of the application processor. For example, the gyro data may include an RS correction value, and the RS correction value may include timing information of a read-out performed for each line when corrected images are generated/displayed. According to an embodiment, because the readout timing is varied depending on the line, the processor 120 may change the order of the gyro data and perform the RS correction. According to an embodiment, the processor 120 may perform the RS correction based on the gyro data having the changed order so as to prevent the corrected images from being distorted when displayed.

At operation 1209, the processor 120 may calculate an RS correction value included in the gyro data. According to an embodiment, the processor 120 may generate corrected images based on the calculated RS correction value, and may store the corrected images in the memory 130. The processor 120 may display the corrected images through a display (e.g., the display device 160 in FIG. 1).

At operation 1211, the processor 120 may determine whether a "save as previewed" option is activated. In general, when the electronic device 101 captures a first image and generates a corrected image (second image), the left/right of an object may be switched. Thus, when the "save as previewed" option is activated, the processor 120 may perform a horizontal flip for the image at operation 1213. If the "save as previewed" option is not activated, the electronic device 101 may skip the horizontal flip.

At operation 1213, the processor 120 may perform the horizontal flip for the corrected image (second image) of the first image being captured through the camera module 180.

At operation 1215, the processor 120 may change directions of the X-axis motion information and the Z-axis motion information included in the gyro motion information. According to an embodiment, when performing the horizontal flip for images, the processor 120 may change the directions of the X-axis motion information and the Z-axis motion information (e.g., Z-axis rotation information) included in the gyro motion information. For example, when the X-axis motion information has a first direction from left to right, the processor 120 may change the first direction of the X-axis motion information to a second direction from right to left by the horizontal flip. The horizontal flip may be an operation of changing each direction of the X-axis motion information and the Z-axis motion information from a predetermined direction to the opposite direction. The processor 120 may change each direction of the X-axis motion information and the Z-axis motion information to the reverse direction (i.e., the opposite direction).

At operation 1217, the processor 120 may perform an image stabilization such as a VDIS and also perform the RS correction based on the RS correction value.

According to various embodiments, the electronic device 101 may perform the vertical flip and/or the horizontal flip under the control of the application processor (e.g., the processor 120). The application processor may calculate the RS correction value and perform the RS correction based on the RS correction value. According to an embodiment, the application processor may perform the motion correction (e.g., the vertical flip and/or the horizontal flip) and/or the RS correction in camera switching. For example, the motion correction may include the vertical flip of switching the top/bottom of images and/or the horizontal flip of switching the left/right of images. The RS correction may include operations of changing the order of readout timing included in the gyro data to the reverse order and correcting images based on the changed order of readout timing.

According to various embodiments, an image correction method of an electronic device (e.g., the electronic device 101 in FIG. 1 or the electronic device 200 in FIG. 2) may include capturing images by using at least one of a first camera (e.g., the first camera module 205 in FIG. 2) or a second camera (e.g., the second camera module 212 in FIG. 3), wherein the first camera module 205 performs shooting based on a first direction corresponding to a front plate (e.g., the front plate 202 in FIG. 2) of the electronic device 101 or 200, and the second camera module 212 performs shooting based on a second direction corresponding to a rear plate (e.g., the rear plate 211 in FIG. 2) of the electronic device 101 or 200; identifying a camera switching command while capturing the images; acquiring gyro motion information through a gyro sensor of the electronic device 101 or 200 in response to the camera switching command; and correcting the captured images, based on the acquired gyro motion information, by an image signal processor (e.g., the image signal processor 660 in FIG. 6) of the electronic device 101 or 200.

According to an embodiment, the method may further include calculating a rolling shutter (RS) correction value corresponding to the acquired gyro motion information; and correcting the captured images, based on the acquired gyro motion information and the calculated RS correction value, by an application processor of the electronic device 101 or 200.

According to an embodiment, the gyro motion information may include X-axis motion information, Y-axis motion information, and Z-axis motion information, and correcting the captured images may include performing a vertical flip for the images, based on the Y-axis motion information and the Z-axis motion information; performing a horizontal flip for the images, based on the X-axis motion information and the Z-axis motion information; and correcting the images through the vertical flip and the horizontal flip.

According to an embodiment, performing the vertical flip may include changing a motion direction for the Y-axis motion information and the Z-axis motion information; and vertically flipping the images, based on the changed motion direction.

According to an embodiment, performing the vertical flip may include changing a motion direction for the Y-axis motion information and the Z-axis motion information; and vertically flipping the images, based on the changed motion direction and the calculated RS correction value.

According to an embodiment, performing the horizontal flip may include changing a motion direction for the X-axis motion information and the Z-axis motion information; and horizontally flipping the images, based on the changed motion direction.

According to an embodiment, performing the horizontal flip may include changing a motion direction for the X-axis motion information and the Z-axis motion information; and horizontally flipping the images, based on the changed motion direction and the calculated RS correction value.

According to an embodiment, the method may further include determining whether an option for capturing the images as previewed is activated; and performing the horizontal flip for the images when the option is activated.

According to an embodiment, the X-axis motion information may include motion direction information corresponding to an X-axis of coordinates, the Y-axis motion information may include motion direction information corresponding to a Y-axis of the coordinates, and the Z-axis motion information may include rotation information corresponding to a Z-axis of the coordinates.

While the disclosure has been particularly shown and described with reference to various embodiments thereof, it will be understood by those skilled in the art that various changes in form and details may be made therein without departing from the scope of the subject matter as defined by the appended claims.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment.

With regard to the description of the drawings, similar reference numerals may be used to refer to similar or related elements.

A singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases.

As used herein, such terms as "1st" and "2nd", or "first" and "second" may be used to simply distinguish a corresponding component from another, and does not limit the components in other aspect (e.g., importance or order). If an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing comprising:
      a front plate,
      a rear plate opposed to and spaced apart from the front plate, and
      a lateral member surrounding a space between the front plate and the rear plate;
   a camera module comprising:
      a first camera disposed in the space and configured to capture images based on a first direction corresponding to the front plate,
      a second camera disposed in the space and configured to capture images based on a second direction corresponding to the rear plate, and
      an image signal processor configured to correct images captured using at least one of the first camera or the second camera;
   a memory;
   a gyro sensor; and
   a processor operatively connected to the camera module, the memory, and the gyro sensor,
   wherein the processor is configured to:
      control at least one of the first camera or the second camera to capture images,
      identify a camera switching command while capturing the images,
      acquire gyro motion information through the gyro sensor in response to the camera switching command, and
      control the image signal processor to correct the captured images, based on the acquired gyro motion information.

2. The electronic device of claim 1,
   wherein the gyro motion information comprises X-axis motion information, Y-axis motion information, and Z-axis motion information, and
   wherein the processor is further configured to:
      perform a vertical flip for the images, based on the Y-axis motion information and the Z-axis motion information, and
      perform a horizontal flip for the images, based on the X-axis motion information and the Z-axis motion information.

3. The electronic device of claim 2, wherein the processor is further configured to, in case of performing the vertical flip for the images:
   change a motion direction for the Y-axis motion information and the Z-axis motion information, and
   correct the images by vertically flipping the images, based on the changed motion direction.

4. The electronic device of claim 2, wherein the processor is further configured to, in case of performing the horizontal flip for the images:
   change a motion direction for the X-axis motion information and the Z-axis motion information, and
   correct the images by horizontally flipping the images, based on the changed motion direction.

5. The electronic device of claim 2, wherein the processor is further configured to:
   determine whether an option for capturing the images as previewed is activated, and
   perform the horizontal flip for the images when the option is activated.

6. The electronic device of claim 2,
   wherein the X-axis motion information comprises motion direction information corresponding to an X-axis of a coordinates,
   wherein the Y-axis motion information comprises motion direction information corresponding to a Y-axis of the coordinates, and
   wherein the Z-axis motion information comprises rotation information corresponding to a Z-axis of the coordinates.

7. An electronic device comprising:
   a housing comprising:
      a front plate,
      a rear plate opposed to and spaced apart from the front plate, and
      a lateral member surrounding a space between the front plate and the rear plate;
   a first camera disposed in the space and configured to capture images based on a first direction corresponding to the front plate;
   a second camera disposed in the space and configured to captured images based on a second direction corresponding to the rear plate;
   a memory;
   a gyro sensor; and
   an application processor operatively connected to the first camera, the second camera, the memory, and the gyro sensor, and configured to correct images captured using at least one of the first camera or the second camera,
   wherein the application processor is configured to:
      control at least one of the first camera or the second camera to capture images,
      identify a camera switching command while capturing the images,
      acquire gyro motion information through the gyro sensor in response to the camera switching command,
      calculate a rolling shutter (RS) correction value corresponding to the acquired gyro motion information, and
      correct the captured images, based on the acquired gyro motion information and the calculated RS correction value.

8. The electronic device of claim 7,
   wherein the gyro motion information comprises X-axis motion information, Y-axis motion information, and Z-axis motion information, and
   wherein the application processor is further configured to:
      perform a vertical flip for the images, based on the Y-axis motion information and the Z-axis motion information, and
      perform a horizontal flip for the images, based on the X-axis motion information and the Z-axis motion information.

9. The electronic device of claim 8, wherein the application processor is further configured to, in case of performing the vertical flip for the images:
   change a motion direction for the Y-axis motion information and the Z-axis motion information, and
   correct the images by vertically flipping the images, based on the changed motion direction and the calculated RS correction value.

10. The electronic device of claim 8, wherein the application processor is further configured to, in case of performing the horizontal flip for the images:
    change a motion direction for the X-axis motion information and the Z-axis motion information, and
    correct the images by horizontally flipping the images, based on the changed motion direction and the calculated RS correction value.

11. The electronic device of claim 8, wherein the application processor is further configured to:
    determine whether an option for capturing the images as previewed is activated, and
    perform the horizontal flip for the images when the option is activated.

12. An image correction method of an electronic device, the method comprising:
    capturing images by using at least one of a first camera or a second camera,
    wherein the first camera captures images based on a first direction corresponding to a front plate of the electronic device, and the second camera captures images based on a second direction corresponding to a rear plate of the electronic device;
    identifying a camera switching command while capturing the images;
    acquiring gyro motion information through a gyro sensor of the electronic device in response to the camera switching command; and
    correcting the captured images, based on the acquired gyro motion information, by an image signal processor of the electronic device.

13. The method of claim 12, further comprising:
    calculating a rolling shutter (RS) correction value corresponding to the acquired gyro motion information; and
    correcting the captured images, based on the acquired gyro motion information and the calculated RS correction value, by an application processor of the electronic device.

14. The method of claim 13,
    wherein the gyro motion information comprises X-axis motion information, Y-axis motion information, and Z-axis motion information, and
    wherein correcting the captured images comprises:
       performing a vertical flip for the images, based on the Y-axis motion information and the Z-axis motion information;
       performing a horizontal flip for the images, based on the X-axis motion information and the Z-axis motion information; and
       correcting the images through the vertical flip and the horizontal flip.

15. The method of claim 14, wherein performing the vertical flip comprises:
    changing a motion direction for the Y-axis motion information and the Z-axis motion information; and
    vertically flipping the images, based on at least one of the changed motion direction or the calculated RS correction value.

16. The method of claim 14, wherein performing the horizontal flip comprises:
    changing a motion direction for the X-axis motion information and the Z-axis motion information; and horizontally flipping the images, based on at least one of the changed motion direction or the calculated RS correction value.

17. The method of claim 14, further comprising:

determining whether an option for capturing the images as previewed is activated; and performing the horizontal flip for the images when the option is activated.

18. The method of claim 14, wherein the X-axis motion information comprises motion direction information corresponding to an X-axis of coordinates, wherein the Y-axis motion information comprises motion direction information corresponding to a Y-axis of the coordinates, and wherein the Z-axis motion information comprises rotation information corresponding to a Z-axis of the coordinates.

19. The method of claim 12, wherein the correcting of the captured images is based on an exchangeable image file format (EXIF) value.

20. The method of claim 19, wherein the EXIF value is calculated based on the acquired gyro motion information.

* * * * *